United States Patent
Hu et al.

(10) Patent No.: US 12,448,453 B2
(45) Date of Patent: Oct. 21, 2025

(54) FULLY HUMAN ANTI-HUMAN CD22 CHIMERIC ANTIGEN RECEPTOR AND APPLICATION THEREOF

(71) Applicant: Nanjing IASO Biotechnology Co., Ltd., Nanjing (CN)

(72) Inventors: Guang Hu, Nanjing (CN); Yongkun Yang, Nanjing (CN); Panpan Niu, Nanjing (CN); Guangrong Meng, Nanjing (CN); Wei Cheng, Nanjing (CN); Jialu Mo, Nanjing (CN)

(73) Assignee: Nanjing IASO Biotechnology Co., Ltd., Nanjing (CN)

( * ) Notice: Subject to any disclaimer, the term of this patent is extended or adjusted under 35 U.S.C. 154(b) by 592 days.

(21) Appl. No.: 17/995,168

(22) PCT Filed: Apr. 2, 2021

(86) PCT No.: PCT/CN2021/085330
§ 371 (c)(1),
(2) Date: Sep. 30, 2022

(87) PCT Pub. No.: WO2021/197483
PCT Pub. Date: Oct. 7, 2021

(65) Prior Publication Data
US 2023/0174654 A1   Jun. 8, 2023

(30) Foreign Application Priority Data
Apr. 2, 2020 (CN) .......................... 202010254388.3

(51) Int. Cl.
| | |
|---|---|
| A61K 39/395 | (2006.01) |
| A61K 35/17 | (2025.01) |
| A61K 39/00 | (2006.01) |
| A61K 40/11 | (2025.01) |
| A61K 40/31 | (2025.01) |
| A61K 40/42 | (2025.01) |
| A61P 35/00 | (2006.01) |
| C07H 21/04 | (2006.01) |
| C07K 16/00 | (2006.01) |
| C07K 16/28 | (2006.01) |
| C07K 16/46 | (2006.01) |

(52) U.S. Cl.
CPC .......... *C07K 16/2851* (2013.01); *A61K 40/11* (2025.01); *A61K 40/31* (2025.01); *A61K 40/4212* (2025.01); *A61P 35/00* (2018.01); *A61K 2239/31* (2023.05); *A61K 2239/38* (2023.05); *A61K 2239/48* (2023.05); *C07K 2317/21* (2013.01); *C07K 2317/565* (2013.01); *C07K 2317/622* (2013.01); *C07K 2317/92* (2013.01); *C07K 2319/02* (2013.01)

(58) Field of Classification Search
None
See application file for complete search history.

(56) References Cited

U.S. PATENT DOCUMENTS

| | | | |
|---|---|---|---|
| 8,481,683 | B2 | 7/2013 | King et al. |
| 9,856,323 | B2 | 1/2018 | Short et al. |
| 2011/0020344 | A1 | 1/2011 | Dimitrov et al. |
| 2023/0241212 | A1* | 8/2023 | Yang ...................... A61P 35/02 424/93.21 |

FOREIGN PATENT DOCUMENTS

| | | |
|---|---|---|
| CN | 109836495 A | 6/2019 |
| WO | 2019/191704 A1 | 10/2019 |
| WO | 2020/014482 A1 | 1/2020 |

OTHER PUBLICATIONS

Fry, T.J., et al., "CD22-Targeted CAR T Cell Induce Remission in B-ALL That is Naive or Resistant to CD19-Targeted CAR Immunotherapy," Nature Medicine 24(1):20-28, Nov. 2017.
Pan, J., et al., "CD22 CAR T-Cell Therapy in Refractory or Relapsed B Acute Lymphoblastic Leukemia," Immunotherapy 33(12):2854-2866, May 2019.
Notice of Refusal mailed Mar. 18, 2025, issued in related JP Application No. 2022-559968, filed Apr. 2, 2021, 6 pages.
European Extended Search Report mailed Mar. 28, 2025, issued in related EP Application No. 21779000.5, filed Apr. 2, 2021, 11 pages.
Written Opinion mailed Jun. 23, 2021, issued in International Application No. PCT/CN2021/085330, filed Apr. 2, 2021, 10 pages.
International Search Report mailed Jun. 23, 2021, issued in International Application No. PCT/CN2021/085330, filed Apr. 2, 2021, 13 pages.

* cited by examiner

*Primary Examiner* — Maher M Haddad
(74) *Attorney, Agent, or Firm* — Christensen O'Connor Johnson Kindness PLLC

(57) ABSTRACT

The present invention provides an anti-CD22 antibody molecule and a CD22-targeted chimeric antigen receptor (CAR) constructed using the anti-CD22 antibody molecule. The present invention also provides an application of the anti-CD22 antibody molecule and the CAR in the preparation of drugs for treating CD22-related diseases.

17 Claims, 9 Drawing Sheets
Specification includes a Sequence Listing.

FULLY HUMAN ANTI-HUMAN CD22 CHIMERIC ANTIGEN RECEPTOR AND APPLICATION THEREOF

CROSS-REFERENCES TO RELATED APPLICATIONS

This application is a National Stage of International Application No. PCT/CN2021/085330, filed Apr. 2, 2021, which claims priority to Chinese Application No. 202010254388.3, filed Apr. 2, 2020, the disclosures of which are incorporated herein by reference in their entirety.

STATEMENT REGARDING SEQUENCE LISTING

The sequence listing associated with this application is provided in text format in lieu of a paper copy and is hereby incorporated by reference into the specification. The name of the text file containing the sequence listing is 1483-P6USPNP_Seq_List_20220930_ST25.txt. The text file is 57 KB; was created on Sep. 30, 2022, contains no new matter, and is being submitted via EFS Web.

FIELD OF THE INVENTION

The present invention relates to anti-CD22 antibody molecules and CD22-targeted chimeric antigen receptors (CARs), and also relates to the application of these antibody molecules and chimeric antigen receptors.

BACKGROUND OF THE INVENTION

CD22 is a B-lineage differentiation antigen, a member of the Siglec lectin family, and includes seven IgG-like domains in the extracellular portion. It is expressed at various stages of B cell development, but not on plasma cells, hematopoietic stem cells or other parenchymal cells. In most cases, CD22 is still expressed during the transformation of normal B cells into tumor cells, and about 70% of B cell lineage lymphoma and leukemia cells express CD22 molecules [1].

In recent years, the development of cellular adoptive immunotherapy has provided new approaches for the treatment of tumors. One approach involves genetically engineered T cells which are made to express chimeric antigen receptors on the cell surface. In a commonly employed structure, a chimeric antigen receptor combines the antigen-binding specificity of a monoclonal antibody with the effector function of a T cell, thereby promoting the specific killing of cells expressing a particular antigen by such genetically engineered T cells. This chimeric antigen receptor-mediated therapy can overcome immune tolerance to self-antigens and is independent of the patient's MHC status.

At present, some CD22-targeted chimeric antigen receptors are in preclinical research or clinical trial stage, but they usually have problems such as insufficient affinity between chimeric antigen receptors and target antigens, and poor cytotoxicity of CAR-T cells to target cells.

SUMMARY OF THE INVENTION

In an aspect, provided herein is an anti-CD22 antibody molecule comprising a light chain variable region and a heavy chain variable region, wherein the heavy chain variable region comprises complementarity-determining regions selected from any of the following groups:
  HCDR1 having the sequence set forth in SEQ ID NO: 4, HCDR2 having the sequence set forth in SEQ ID NO: 5 and HCDR3 having the sequence set forth in SEQ ID NO: 6;
  HCDR1 having the sequence set forth in SEQ ID NO: 10, HCDR2 having the sequence set forth in SEQ ID NO: 11 and HCDR3 having the sequence set forth in SEQ ID NO: 12; and
  HCDR1 having the sequence set forth in SEQ ID NO: 16, HCDR2 having the sequence set forth in SEQ ID NO: 17 and HCDR3 having the sequence set forth in SEQ ID NO: 18.

In some embodiments, the heavy chain variable region comprises an amino acid sequence having at least 90% sequence identity with the sequence set forth in SEQ ID NO: 20, SEQ ID NO: 22, or SEQ ID NO: 24.

In some embodiments, the anti-CD22 antibody molecule is in the form of IgG with a $K_D$ value of no greater than 2 nM for binding to CD22; or the anti-CD22 antibody molecule is in the form of Fab with a $K_D$ value of no greater than 20 nM for binding to CD22.

In some embodiments, the anti-CD22 antibody molecule is a fully human antibody molecule.

In another aspect, provided herein is an anti-CD22 antibody molecule comprising a light chain variable region and a heavy chain variable region, wherein the light chain variable region comprises complementarity-determining regions selected from any of the following groups:
  LCDR1 having the sequence set forth in SEQ ID NO: 1, LCDR2 having the sequence set forth in SEQ ID NO: 2 and LCDR3 having the sequence set forth in SEQ ID NO: 3;
  LCDR1 having the sequence set forth in SEQ ID NO: 7, LCDR2 having the sequence set forth in SEQ ID NO: 8 and LCDR3 having the sequence set forth in SEQ ID NO: 9; and
  LCDR1 having the sequence set forth in SEQ ID NO: 13, LCDR2 having the sequence set forth in SEQ ID NO: 14 and LCDR3 having the sequence set forth in SEQ ID NO: 15; and
  the heavy chain variable region comprises complementarity-determining regions selected from any of the following groups:
  HCDR1 having the sequence set forth in SEQ ID NO: 4, HCDR2 having the sequence set forth in SEQ ID NO: 5 and HCDR3 having the sequence set forth in SEQ ID NO: 6;
  HCDR1 having the sequence set forth in SEQ ID NO: 10, HCDR2 having the sequence set forth in SEQ ID NO: 11 and HCDR3 having the sequence set forth in SEQ ID NO: 12; and
  HCDR1 having the sequence set forth in SEQ ID NO: 16, HCDR2 having the sequence set forth in SEQ ID NO: 17 and HCDR3 having the sequence set forth in SEQ ID NO: 18.

In some embodiments, the light chain variable region comprises LCDR1 having the sequence set forth in SEQ ID NO: 1, LCDR2 having the sequence set forth in SEQ ID NO: 2, and LCDR3 having the sequence set forth in SEQ ID NO: 3, and the heavy chain variable region comprises HCDR1 having the sequence set forth in SEQ ID NO: 4, HCDR2 having the sequence set forth in SEQ ID NO: 5, and HCDR3 having the sequence set forth in SEQ ID NO: 6;
  the light chain variable region comprises LCDR1 having the sequence set forth in SEQ ID NO: 7, LCDR2 having the sequence set forth in SEQ ID NO: 8, and LCDR3 having the sequence set forth in SEQ ID NO: 9, and the heavy chain variable region comprises HCDR1 having the sequence set forth in SEQ ID NO: 10, HCDR2 having the sequence set forth in SEQ ID NO: 11, and HCDR3 having the sequence set forth in SEQ ID NO: 12; or the light chain variable region comprises LCDR1 having the sequence set forth in SEQ ID NO: 13, LCDR2 having the sequence set forth in SEQ ID NO: 14, and LCDR3 having the sequence set forth in SEQ ID NO: 15, and the heavy chain variable region comprises HCDR1 having the sequence set forth in SEQ ID NO: 16, HCDR2 having the sequence set forth in SEQ ID NO: 17, and HCDR3 having the sequence set forth in SEQ ID NO: 18.

In some embodiments, the light chain variable region comprises an amino acid sequence having at least 90% sequence identity with the sequence set forth in SEQ ID NO: 19, SEQ ID NO: 21, or SEQ ID NO: 23.

In some embodiments, the heavy chain variable region comprises an amino acid sequence having at least 90% sequence identity with the sequence set forth in SEQ ID NO: 20, SEQ ID NO: 22, or SEQ ID NO: 24.

In some embodiments, the light chain variable region comprises an amino acid sequence having at least 90% sequence identity with the sequence set forth in SEQ ID NO: 19, and the heavy chain variable region comprises an amino acid sequence having at least 90% sequence identity with the sequence set forth in SEQ ID NO: 20; the light chain variable region comprises an amino acid sequence having at least 90% sequence identity with the sequence set forth in SEQ ID NO: 21, and the heavy chain variable region comprises an amino acid sequence having at least 90% sequence identity with the sequence set forth in SEQ ID NO: 22; or the light chain variable region comprises an amino acid sequence having at least 90% sequence identity with the sequence set forth in SEQ ID NO: 23, and the heavy chain variable region comprises an amino acid sequence having at least 90% sequence identity with the sequence set forth in SEQ ID NO: 24.

In some embodiments, the anti-CD22 antibody molecule is in the form of scFv and comprises an amino acid sequence having at least 90% sequence identity with the sequence set forth in SEQ ID NO: 25, SEQ ID NO: 26 or SEQ ID NO: 27.

In some embodiments, the anti-CD22 antibody molecule is in the form of IgG with a $K_D$ value of no greater than 2 nM for binding to CD22; or the anti-CD22 antibody molecule is in the form of Fab with a $K_D$ value of no greater than 20 nM for binding to CD22.

In some embodiments, the anti-CD22 antibody molecule is a fully human antibody molecule.

In another aspect, provided herein is a CD22-targeted chimeric antigen receptor comprising an antigen-binding domain binding to CD22, the antigen-binding domain comprising a light chain variable region and a heavy chain variable region, wherein the light chain variable region comprises complementarity-determining regions selected from any of the following groups:

LCDR1 having the sequence set forth in SEQ ID NO: 1, LCDR2 having the sequence set forth in SEQ ID NO: 2 and LCDR3 having the sequence set forth in SEQ ID NO: 3;

LCDR1 having the sequence set forth in SEQ ID NO: 7, LCDR2 having the sequence set forth in SEQ ID NO: 8 and LCDR3 having the sequence set forth in SEQ ID NO: 9; and LCDR1 having the sequence set forth in SEQ ID NO: 13, LCDR2 having the sequence set forth in SEQ ID NO: 14 and LCDR3 having the sequence set forth in SEQ ID NO: 15; and the heavy chain variable region comprises complementarity-determining regions selected from any of the following groups:

HCDR1 having the sequence set forth in SEQ ID NO: 4, HCDR2 having the sequence set forth in SEQ ID NO: 5 and HCDR3 having the sequence set forth in SEQ ID NO: 6;

HCDR1 having the sequence set forth in SEQ ID NO: 10, HCDR2 having the sequence set forth in SEQ ID NO: 11 and HCDR3 having the sequence set forth in SEQ ID NO: 12; and HCDR1 having the sequence set forth in SEQ ID NO: 16, HCDR2 having the sequence set forth in SEQ ID NO: 17 and HCDR3 having the sequence set forth in SEQ ID NO: 18.

In some embodiments, the light chain variable region comprises LCDR1 having the sequence set forth in SEQ ID NO: 1. LCDR2 having the sequence set forth in SEQ ID NO: 2, and LCDR3 having the sequence set forth in SEQ ID NO: 3, and the heavy chain variable region comprises HCDR1 having the sequence set forth in SEQ ID NO: 4, HCDR2 having the sequence set forth in SEQ ID NO: 5, and HCDR3 having the sequence set forth in SEQ ID NO: 6;

the light chain variable region comprises LCDR1 having the sequence set forth in SEQ ID NO: 7, LCDR2 having the sequence set forth in SEQ ID NO: 8, and LCDR3 having the sequence set forth in SEQ ID NO: 9, and the heavy chain variable region comprises HCDR1 having the sequence set forth in SEQ ID NO: 10, HCDR2 having the sequence set forth in SEQ ID NO: 11, and HCDR3 having the sequence set forth in SEQ ID NO: 12; or the light chain variable region comprises LCDR1 having the sequence set forth in SEQ ID NO: 13, LCDR2 having the sequence set forth in SEQ ID NO: 14, and LCDR3 having the sequence set forth in SEQ ID NO: 15, and the heavy chain variable region comprises HCDR1 having the sequence set forth in SEQ ID NO: 16, HCDR2 having the sequence set forth in SEQ ID NO: 17, and HCDR3 having the sequence set forth in SEQ ID NO: 18.

In some embodiments, the light chain variable region comprises an amino acid sequence having at least 90% sequence identity with the sequence set forth in SEQ ID NO: 19, SEQ ID NO: 21, or SEQ ID NO: 23.

In some embodiments, the heavy chain variable region comprises an amino acid sequence having at least 90% sequence identity with the sequence set forth in SEQ ID NO: 20, SEQ ID NO: 22, or SEQ ID NO: 24.

In some embodiments, the light chain variable region comprises an amino acid sequence having at least 90% sequence identity with the sequence set forth in SEQ ID NO: 19, and the heavy chain variable region comprises an amino acid sequence having at least 90% sequence identity with the sequence set forth in SEQ ID NO: 20; the light chain variable region comprises an amino acid sequence having at least 90% sequence identity with the sequence set forth in SEQ ID NO: 21, and the heavy chain variable region comprises an amino acid sequence having at least 90% sequence identity with the sequence set forth in SEQ ID NO: 22; or the light chain variable region comprises an amino acid sequence having at least 90% sequence identity with the sequence set forth in SEQ ID NO: 23, and the heavy chain variable region comprises an amino acid sequence having at least 90% sequence identity with the sequence set forth in SEQ ID NO: 24.

In some embodiments, the antigen-binding domain is in the form of scFv.

In some embodiments, the antigen-binding domain comprises an amino acid sequence having at least 90% sequence identity with the sequence set forth in SEQ ID NO: 25, SEQ ID NO: 26, or SEQ ID NO: 27.

In some embodiments, the chimeric antigen receptor further comprises a CD3z intracellular signaling domain and a 4-1BB costimulatory signaling domain.

In some embodiments, the chimeric antigen receptor comprises, sequentially from N-terminal to C-terminal, a CD8α signal peptide, the antigen-binding domain, a CD8α hinge region, a transmembrane region, a 4-1BB costimulatory signaling domain, and a CD3z intracellular signaling domain.

In some embodiments, the chimeric antigen receptor comprises an amino acid sequence having at least 90% sequence identity with the sequence set forth in SEQ ID NO: 35, SEQ ID NO: 36, or SEQ ID NO: 37.

In some embodiments, the chimeric antigen receptor further comprises self-cleaving polypeptide T2A and tEGFR sequence at the C-terminus.

In another aspect, provided herein is a nucleic acid molecule encoding the aforementioned antibody molecule or the aforementioned chimeric antigen receptor.

In some embodiments, the nucleic acid molecule comprises the nucleotide sequence set forth in SEQ ID NO: 38, SEQ ID NO: 39, or SEQ ID NO: 40.

In some embodiments, the nucleic acid molecule comprises the nucleotide sequence set forth in SEQ ID NO: 43, SEQ ID NO: 44, or SEQ ID NO: 45.

In another aspect, provided herein is an expression vector comprising the aforementioned nucleic acid molecule.

In another aspect, provided herein is an immune cell expressing the aforementioned chimeric antigen receptor.

In some embodiments, the immune cells are T cells or NK cells.

In another aspect, provided herein is a pharmaceutical composition comprising the aforementioned antibody molecule, the aforementioned chimeric antigen receptor, or the aforementioned immune cell, and a pharmaceutically acceptable carrier.

In another aspect, provided herein is the use of the aforementioned antibody molecule, the aforementioned chimeric antigen receptor, the aforementioned nucleic acid molecule, the aforementioned expression vector, or the aforementioned immune cell in the preparation of a drug for treating a CD22-related disease.

In some embodiments, the CD22-related disease is B-cell leukemia or B-cell lymphoma.

In another aspect, provided herein is a method of treating a CD22-related disease in a patient, comprising administering to the patient a therapeutically effective amount of the aforementioned antibody molecule, the aforementioned immune cell, or the aforementioned pharmaceutical composition.

In some embodiments, the CD22-related disease is B-cell leukemia or B-cell lymphoma.

DETAILED DESCRIPTION OF THE INVENTION

Figure 1:
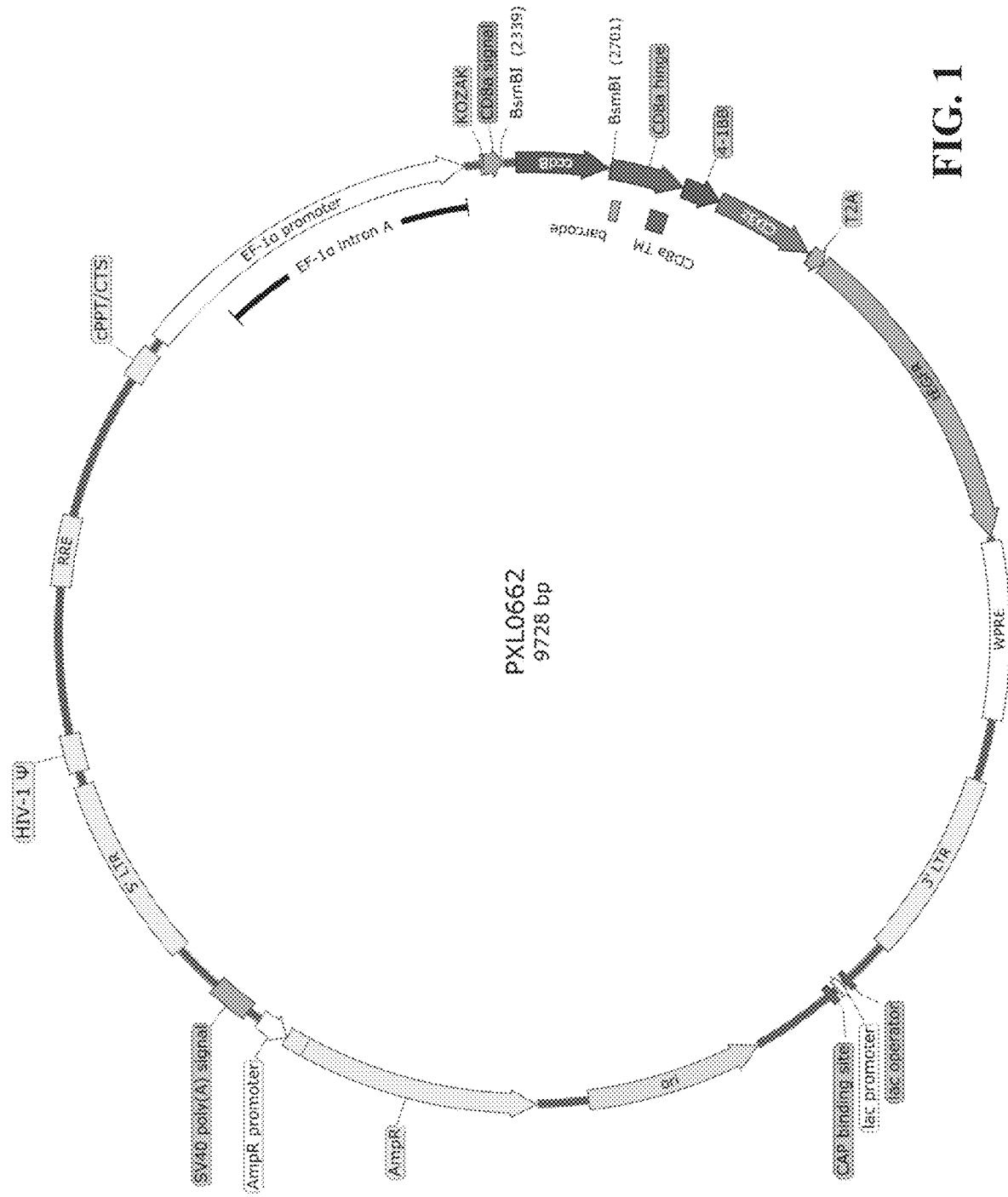
FIG. 1 is a schematic diagram of the structure of the plasmid vector used in the present invention.

Unless otherwise defined, all technical and scientific terms used herein have the meaning as commonly understood by one of ordinary skill in the art.

"Antibody" refers to an immunoglobulin secreted by plasma cells (effector B cells) and used by the body's immune system to neutralize foreign substances (polypeptides, viruses, bacteria, etc.). The foreign substance is correspondingly called an antigen. The basic structure of a classical antibody molecule is a 4-mer consisting of 2 identical heavy chains and 2 identical light chains. According to the conservative differences in amino acid sequences, the heavy and light chains are divided into a variable region (V) at the amino terminus and a constant region (C) at the carboxy terminus. The variable regions of one heavy chain and one light chain interact to form the antigen-binding site (Fv). In the variable region, the composition and arrangement of amino acid residues in certain regions are more variable than other regions (framework regions, FRs) in the variable region, these regions are called hypervariable regions (HVRs) and are actually the key sites for binding of antibodies to antigens. Since these hypervariable regions have their sequences complementary to antigenic determinants, they are also called complementarity-determining regions (CDRs). Both heavy and light chains have three complementarity-determining regions, designated HCDR1, HCDR2, HCDR3 and LCDR1, LCDR2, LCDR3, respectively. In some cases, antibodies may also be used to refer to antibody fragments that have antigen-binding ability, such as scFv, Fab, and F(ab')2.

"Single chain fragment variable (scFv)" is composed of antibody heavy and light chain variable regions linked by a short peptide into a peptide chain. Through correct folding, the variable regions from the heavy chain and the light chain interact through non-covalent bonds to form the Fv segment, so the scFv can well retain its affinity for the antigen.

"Chimeric antigen receptor (CAR)", also known as chimeric T cell receptor, and chimeric immunoreceptor, is an engineered membrane protein receptor molecule that confers a desired specificity to immune effector cells, such as the ability to bind to specific tumor antigens. Chimeric antigen receptors generally consist of an extracellular antigen-binding domain, a transmembrane domain, and an intracellular signaling domain. In some cases, the antigen-binding domain is an scFv sequence responsible for recognizing and binding to a specific antigen. Intracellular signaling domains usually comprise immunoreceptor tyrosine activation motifs (ITAMs), such as the signaling domains derived from CD3z molecules, which are responsible for activating immune effector cell to produce killing effects. In addition, the chimeric antigen receptor may also comprise a signal peptide responsible for intracellular localization of the nascent protein at the amino terminus, and a hinge region between the antigen-binding domain and the transmembrane domain. In addition to signaling domains, intracellular signaling domains can also comprise costimulatory domains derived from, for example, 4-1BB or CD28 molecules. When describing CAR structures herein, the abbreviation "bbz" may be used to refer to the intracellular signaling domain that comprises 4-1BB and CD3z, for example, the CAR molecule comprising antibody clone 80 (as the antigen-binding domain) and 4-1BB and CD3z (as the intracellular signaling domain) is abbreviated as "clone80-bbz".

"CAR-T cells" refer to T cells expressing CARs, which are usually obtained by transducing T cells with an expression vector encoding CARs. Commonly used expression vectors are viral vectors, such as lentiviral expression vectors. Chimeric antigen receptor-modified T cells (CAR-Ts) are not restricted by major histocompatibility complexes, and have specific targeted killing activity and the ability for persistent amplification. In addition to T cells, other lymphocytes such as NK cells can also be transduced with an expression vector encoding a CAR to obtain targeted killer cells expressing the CAR.

"CD22" is a Siglec family lectin, including 7 IgG-like domains in the extramembrane portion, with a molecular weight of about 135 kD. Human CD22 and variants thereof are available in UniProt under accession number P20273. As a transmembrane glycoprotein, it is initially expressed on the surface of B cells at the pre-B cell stage, exists on mature B cells, and disappears on plasma cells. The National Cancer Institute of the United States reported the phase I clinical results of a CD22-targeted chimeric antigen receptor T cell (CAR-T), confirming that CD22 CAR-T is safe and effective, and can induce remission in some patients [2]. Therefore, CD22 protein is an ideal B cell tumor target.

"m971 molecule" is an anti-CD22 antibody panned from a human Fab phage library using a CD22-Fc fusion protein, which binds to the juxtamembrane epitope of the CD22 molecule [3]. The CAR constructed with the m971-derived scFv showed good anti-leukemia activity in preclinical models [4]. In some Examples herein, a CAR constructed with m971 scFv (amino acid sequence SEQ ID NO: 28) is used as the reference to evaluate some biological activities of the CARs provided herein.

"$K_D$" is the equilibrium dissociation constant, which can be used to measure the binding affinity between an antibody and its antigen. The smaller the $K_D$ value, the stronger the affinity.

The term "sequence identity" when referring to amino acid or nucleotide sequences refers to the degree of identity between two amino acid or nucleotide sequences (e.g., a query sequence and a reference sequence), usually expressed as a percentage. Typically, prior to calculating the percentage identity between two amino acid or nucleotide sequences, the sequences are aligned and gaps (if any) are introduced. If at a certain alignment position, the amino acid residues or bases in the two sequences are the same, the two sequences are considered to be identical or matched at that position; and if the amino acid residues or bases in the two sequences are different, they are considered to be non-identical or mismatched at that position. In some algorithms, the number of matched positions is divided by the total number of positions in the alignment window to obtain sequence identity. In other algorithms, the number of gaps and/or the gap length are also taken into account. For the purposes of the present invention, the published alignment software BLAST (available at ncbi.nlm.nih.gov) can be employed to obtain optimal sequence alignments by using default settings and calculate the sequence identity between two amino acid or nucleotide sequences.

In some embodiments, the light chain variable region of the anti-CD22 antibody molecule provided by the invention comprises an amino acid sequence having at least 90% sequence identity (e.g., at least 95%, at least 98%, at least 99% or even 100% sequence identity) with the sequence set forth in SEQ ID NO: 19, and the heavy chain variable region comprises an amino acid sequence having at least 90% sequence identity (e.g., at least 95%, at least 98%, at least 99% or even 100% sequence identity) with the sequence set forth in SEQ ID NO: 20.

In some embodiments, the light chain variable region of the anti-CD22 antibody molecule provided by the invention comprises an amino acid sequence having at least 90% sequence identity (e.g., at least 95%, at least 98%, at least 99% or even 100% sequence identity) with the sequence set forth in SEQ ID NO: 21, and the heavy chain variable region comprises an amino acid sequence having at least 90% sequence identity (e.g., at least 95%, at least 98%, at least 99% or even 100% sequence identity) with the sequence set forth in SEQ ID NO: 22.

In some embodiments, the light chain variable region of the anti-CD22 antibody molecule provided by the invention comprises an amino acid sequence having at least 90% sequence identity (e.g., at least 95%, at least 98%, at least 99% or even 100% sequence identity) with the sequence set forth in SEQ ID NO: 23, and the heavy chain variable region comprises an amino acid sequence having at least 90% sequence identity (e.g., at least 95%, at least 98%, at least 99% or even 100% sequence identity) with the sequence set forth in SEQ ID NO: 24.

In some embodiments, the antigen-binding domain in the CAR provided by the invention comprises an amino acid sequence having at least 90% sequence identity (e.g., at least 95%, at least 98%, at least 99% or even 100% sequence identity) with the sequence set forth in SEQ ID NO: 25, SEQ ID NO: 26 or SEQ ID NO: 27.

In some embodiments, the CAR provided by the invention comprises an amino acid sequence having at least 90% sequence identity (e.g., at least 95%, at least 98%, at least 99% or even 100% sequence identity) with the sequence set forth in SEQ ID NO: 35, SEQ ID NO: 36 or SEQ ID NO: 37.

Those skilled in the art can understand that, on the basis of the specific sequences provided herein, the corresponding variants of the anti-CD22 antibody molecules or CD22-targeted chimeric antigen receptors provided by the invention can be obtained by substituting, deleting, adding a few amino acids, and verifying or screening the resultant product for its binding ability with the corresponding antigen CD22 or its biological activity, and these variants should also be included within the scope of the present invention.

Those skilled in the art can also understand that, on the basis of the specific heavy chain variable region sequences provided herein, an antibody light chain library (such as a human phage light chain library) can be screened by using CD22 as the antigen, so as to obtain light chain variable regions matched with the heavy chain variable region while maintaining CD22 binding ability. Anti-CD22 antibody molecules obtainable in this way and CD22-targeted CARs constructed using the anti-CD22 antibody molecules are also included within the scope of the present invention.

When referring to pharmaceutical compositions, "pharmaceutically acceptable carrier" is used to refer to substances such as solid or liquid diluents, fillers, antioxidants, and stabilizers, which are safe for administration, and which are suitable for administration to humans and/or animals without undue adverse side effects, while being suitable for maintaining the viability of the drug or active agent therein.

A "therapeutically effective amount" refers to an amount of an active compound sufficient to elicit the biological or medical response desired by a clinician in a subject. The "therapeutically effective amount" of the bispecific antibody of the present invention can be determined by those skilled in the art according to the administration route, the subject's body weight, age, condition and other factors. For example, a typical daily dose may range from 0.01 mg to 100 mg of active ingredient per kg of body weight.

The CAR-T cells prepared by using the anti-CD22 antibody molecules screened out in the present invention have better killing activity against CD22-expressed target cells in vitro and in vivo, and are expected to be used for the treatment of some lymphomas and leukemias.

The present invention will be further described below through specific examples.

Example 1 Preparation and Analysis of Anti-CD22 Antibody Molecules

Screening of fully human antibodies against CD22 by yeast surface display technology. An established scFv yeast display library was subjected to multiple rounds of fluorescence-activated cell sorting with biotinylated CD22-llama-Fc or CD22-his protein, and a total of 129 fully human antibody clones against CD22 were obtained. They were sequenced and used for subsequent in vitro and in vivo screening.

The prepared antibodies were prepared in the form of IgG and Fab, respectively, and their binding ability to human CD22 was tested (ForteBio). Part of the results are as shown in Tables 1 and 2.

TABLE 1

Detection results of binding of antibodies in the form of IgG to human CD22

| Clone ID | IgG $K_D$ (M) Avid | kon (1/Ms) | koff (1/s) | Response (nm) |
|---|---|---|---|---|
| 17 | 1.6E−09 | 1.3E+05 | 2.0E−04 | 0.62 |
| 28 | 9.7E−10 | 2.1E+05 | 2.0E−04 | 0.81 |
| 80 | 8.2E−10 | 2.4E+05 | 2.0E−04 | 0.93 |

TABLE 2

Detection results of binding of antibodies in the form of Fab to human CD22

| Clone ID | Fab $K_D$ (M) Monovalent | kon (1/Ms) | koff (1/s) | Response (nm) |
|---|---|---|---|---|
| 17 | 8.1E−09 | 2.1E+05 | 1.7E−03 | 0.19 |
| 28 | 9.4E−10 | 2.8E+05 | 2.7E−04 | 0.25 |
| 80 | 1.3E−08 | 3.6E+05 | 4.6E−03 | 0.24 |

All 129 antibodies were grouped into 7 Bins by epitope binning analysis. Among them, Bin 3 is the m971 competition group. The antigen-binding sites of Bins 4 and 5 are the extracellular juxtamembrane regions of CD22. We selected all the antibodies of Bins 3, 4, and 5, as well as the antibodies of 4 other Bins, a total of 62 antibody sequences, for the subsequent preliminary screening by the reporter gene method. Among them, clones 80 and 28 have similar antigenic epitopes binding to m971, all of which belong to Bin 3. The binding epitope of clone 17 is different from that of m971 and it belongs to Bin 4.

Example 2 CD22 CAR Plasmid Vector Construction

First, a nucleotide sequence (SEQ ID NO: 42) was artificially synthesized, which contains KOZAK (bases 1-9), CD8α signal peptide (bases 10-72, and the corresponding amino acid sequence is SEQ ID NO: 30), ccdB screening gene (bases 73-428), CD8α hinge region and transmembrane region (bases 429-677, and the corresponding amino acid sequence is SEQ ID NO: 31), 4-1BB costimulatory factor (bases 678-803, and the corresponding amino acid sequence is SEQ ID NO: 32), CD3z intracellular signaling domain (bases 804-1139, the corresponding amino acid sequence is SEQ ID NO: 33), T2A cleavable peptide (bases 1140-1202, and the corresponding amino acid sequence is SEQ ID NO: 29), and tEGFR (bases 1203-2276, and the corresponding amino acid sequence is SEQ ID NO: 34). By PCR splicing method, the aforementioned synthetic sequence was inserted into the multi-cloning site of the lentiviral vector PLVX-EF1alpha-IRES-Puro plasmid (Clontech, Cat. No. 631988) to obtain the PXL0662 plasmid shown in FIG. 1.

Then, the nucleotide sequences encoding scFv (e.g., SEQ ID NO: 38, SEQ ID NO: 39, SEQ ID NO: 40, SEQ ID NO: 41 nucleotide sequences) were synthesized separately, and through the two type II endonuclease site BsmBIs (sites 2339 and 2701) in the PXL0662 plasmid, the nucleotide sequences of these scFvs were inserted into PXL0662 separately to obtain the plasmid vectors encoding the CD22 CAR.

Example 3 Primary Screening by CD22 CAR Reporter Gene Method

Working Principle

The activation of CAR-T cells is achieved by CD3z and costimulatory factors in the intracellular region of CAR molecules, wherein CD3z can activate the NFAT signaling pathway in the cells, which is a necessary condition for CAR-T cell activation. Therefore, CAR molecules with the function of activating the NFAT signaling pathway can be screened out by the NFAT reporter gene method [5].

Figure 2:
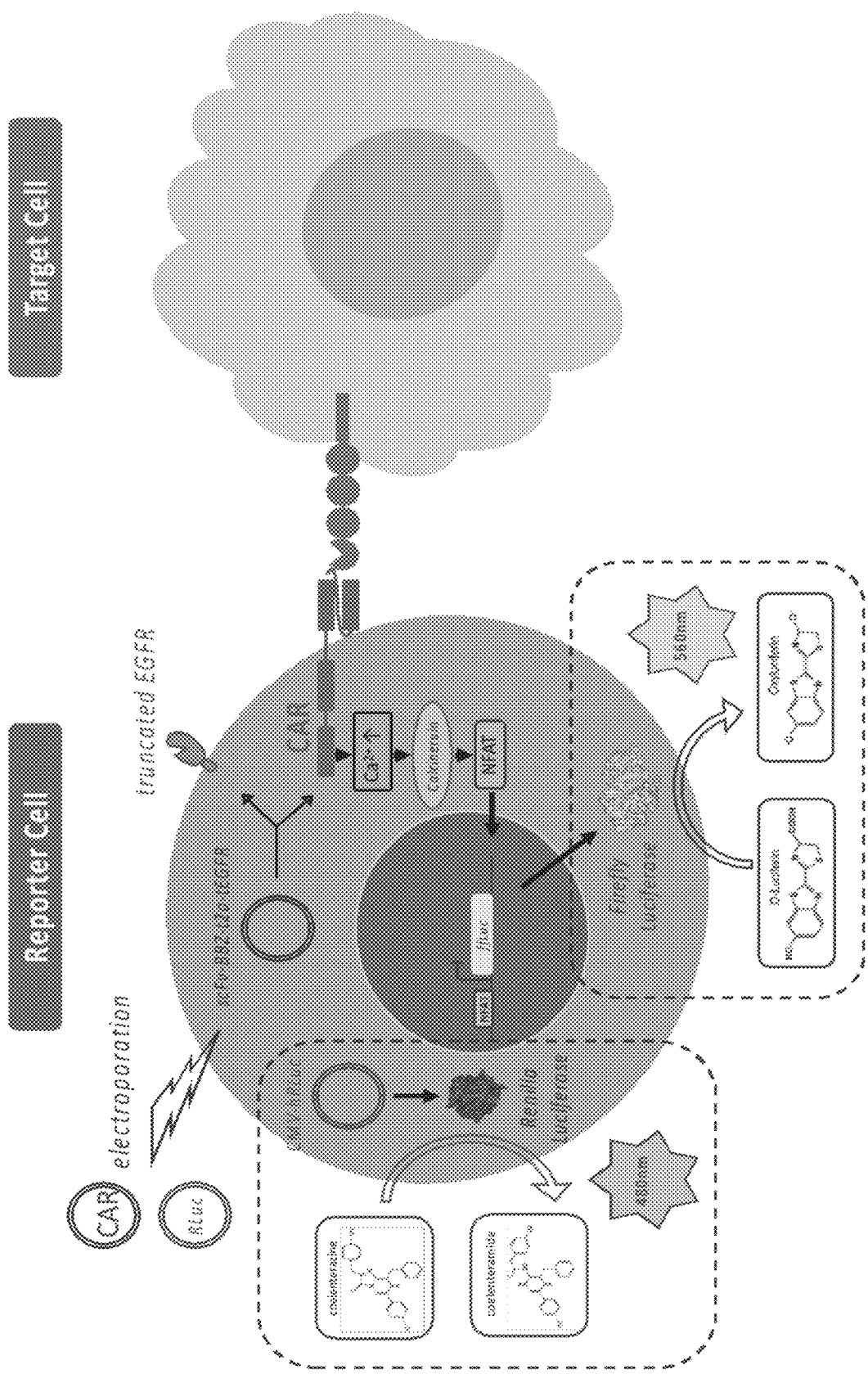
FIG. 2 shows a schematic diagram of the working principle of the reporter gene method.

In the process of primary screening, Jurkat cells integrated with the NFAT-RE-ffLuc reporter gene are used as reporter cells (as shown in FIG. 2, the cells are named JLuc307). CAR molecules are transiently expressed on the surface of reporter cells by plasmid electroporation. When a reporter cell expressing a CAR molecule and a target cell are co-incubated, the target cell surface antigen can specifically activate the CAR molecule, thereby activating the expression of the reporter gene (ffLuc, firefly luciferase). Then, by detecting the activity of luciferase, the ability of the CAR molecule to activate the NFAT signaling pathway can be evaluated. The plasmid used in this reporter gene method also includes a sequence encoding a truncated EGFR (tEGFR), which can be used to label cells that successfully express CAR when tEGFR is expressed on the cell surface. In addition, since different CAR molecules have different electroporation efficiencies, the internal reference plasmid (CMV-hRLuc, *Renilla* luciferase) mixed with CAR molecules can be used to calibrate the electroporation efficiency.

Operation Steps

1) Mix the CAR plasmid to be tested and the internal reference plasmid according to a fixed ratio, and transfect the reporter cells by electroporation method;
2) 48 h after transfection, take some cells and stain them with PE-anti human EGFR antibody for flow cytometry to evaluate the transient expression of CAR plasmid;
3) 72 h after transfection, mix the reporter cells and target cells in a ratio of 1:1, and then place them separately in a U-bottom 96-well plate to incubate for 24 h; wherein $3 \times 10^4$ reporter cells are added to each well, and 3 duplicate wells are set for each of target cell; and
4) After completion of incubation, perform centrifugation at 1000 g for 5 min at 4° C., remove the culture supernatant, add 100 μL of lysis buffer to each well to lyse the cells, and take 20 μL of the cell lysate for dual-luciferase activity detection.

Screening Criteria

CD22-positive target cells can effectively activate the NFAT-RE-ffLuc reporter gene to generate fluorescent signals. In the absence of stimulation by target cells or CD22-negative target cells, the fluorescent signal resulting from background (tonic effects) or non-specific activation is low.

Results

The primary screening was conducted in 6 batches, PXL0589 (m971-bbz-T2A-tEGFR, clone 0-2) plasmid was used as a positive control and pGL4.75 plasmid (No. PXL0337) as a negative control (mock) in each batch.

Figure 3:
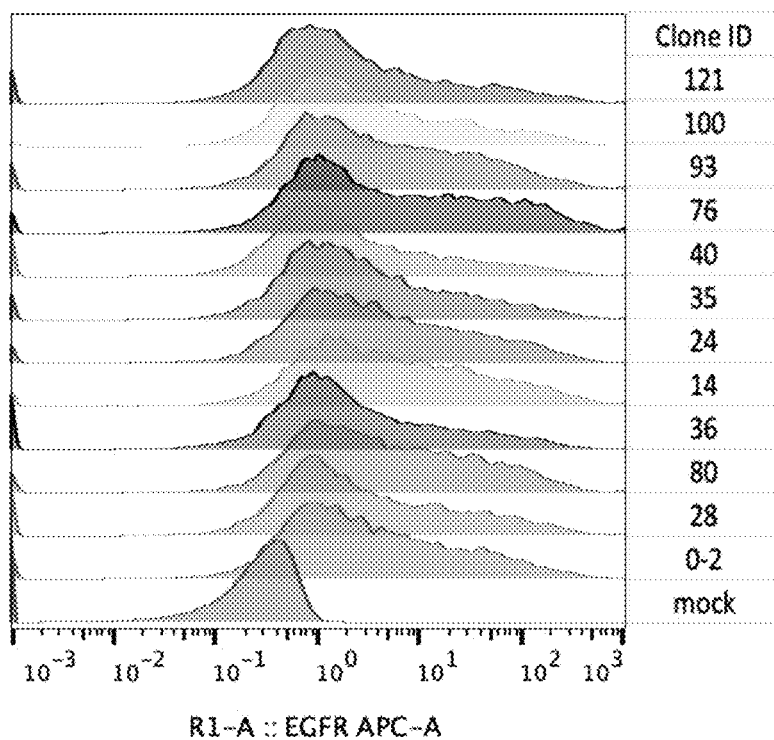
FIG. 3 shows the flow cytometric results of transient expression of CAR molecules with different clone IDs on the reporter cell JLuc307. Indirect characterization was performed by staining with an EGFR antibody (APC anti-human EGFR antibody (cloneAY13)), and cells electrotransfected with a plasmid encoding Renilla luciferase (Promega, pGL4.75) served as a negative control (mock).

Because the koff values of the 62 antibodies to be tested were different, and some antibodies dissociated quickly after binding to the CD22 antigen, the transient expression of CAR molecules on the reporter cell JLuc307 was indirectly characterized by EGFR antibodies. The results of flow cytometry showed that, except for clone 4, the remaining 61 CAR molecules to be tested could be transiently expressed on JLuc307 cells. A representative flow cytometry chart is shown in FIG. 3.

Figure 4:
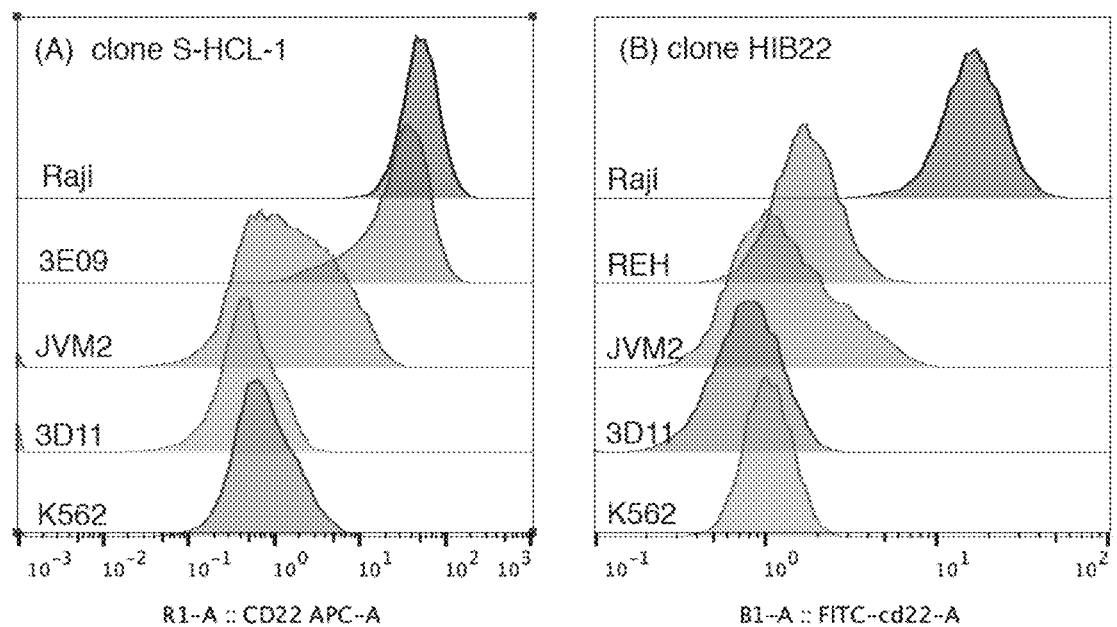
FIG. 4 shows the expression of CD22 antigen on target cells used in the present invention. 4A: CD22 antigen on target cells was stained using APC anti-human CD22 antibody (clone S-HCL-1). 4B: CD22 antigen on target cells was stained using FITC anti-human CD22 antibody (clone HIB22).

In the process of preliminary screening by the reporter gene method, cells such as Raji, REH, JVM2, K562 and CD22 K/O Raji (clone 3D11 or 3E09, which are CD22 knockout/knockdown Raji cells prepared by us) were selected as target cells. Before the primary screening, we used APC mouse anti-human CD22 antibody (clone S-HCL-1) or FITC mouse anti-human CD22 antibody (clone HIB22) to detect the expression of CD22 antigen on the surface of target cells by flow cytometry individually. The results are shown in FIG. 4, in which Raji cells express CD22 highly; 3E09, REH, and JVM2 cells express CD22 moderately; and K562 and 3D11 cells are CD22 negative cells.

Figure 5:
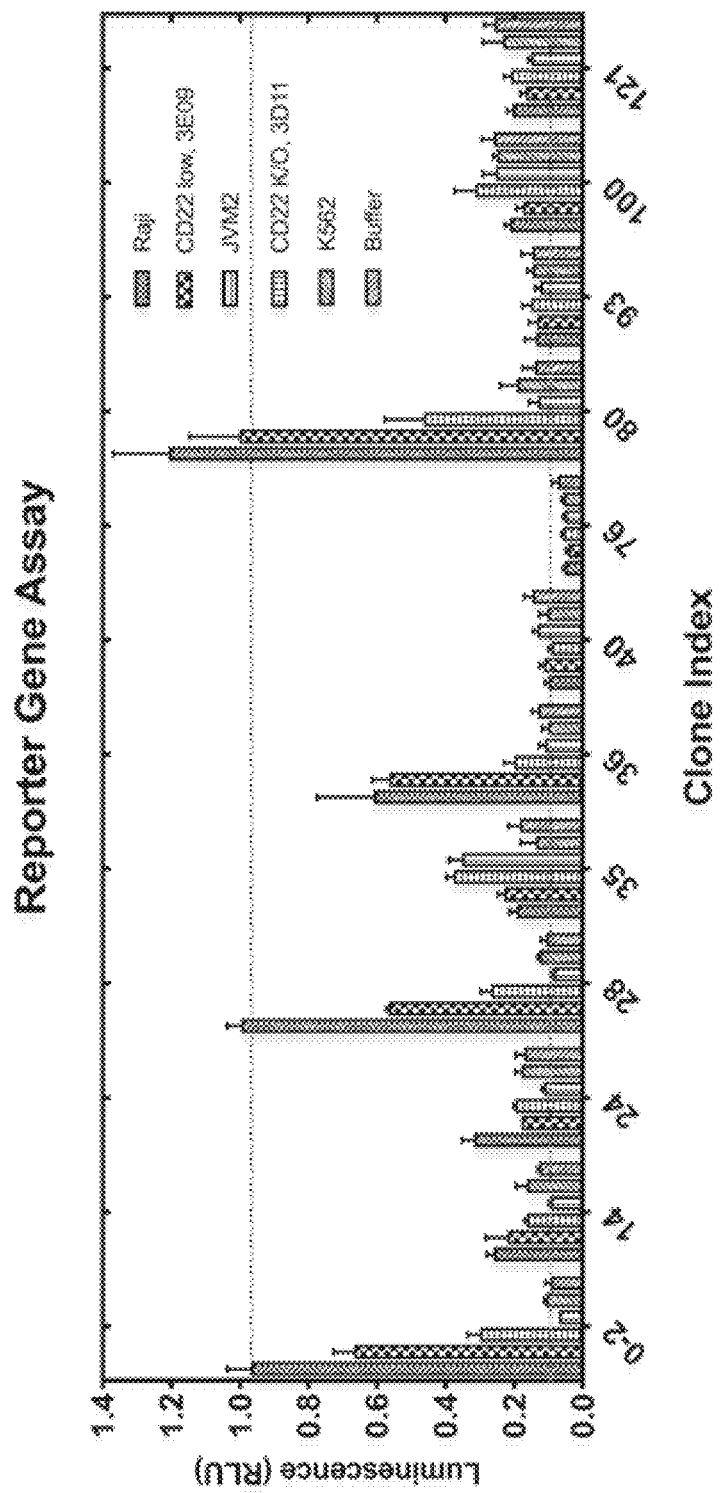
FIG. 5 shows some of the detection results of the reporter gene method. Among others, the y-axis reading is the flLuc/RLuc ratio (RLU) of the samples normalized to the flLuc/RLuc ratio of the positive reference (co-incubated samples of Clone 0-2 and Raji cells).

Two sets of fluorescence readings of firefly luciferase (ffLuc) and *Renilla* luciferase (RLuc) can be obtained by the dual luciferase reporter gene detection kit individually; among them, the *Renilla* luciferase reading is used as an internal reference to eliminate differences in cell quantity or transfection efficiency. Therefore, the level of transcriptional regulation of NFAT-RE-ffLuc produced by each CAR sample as activated by the target cell can be characterized by the ffLuc/RLuc ratio (RLU). Taking the first batch of detections as an example, the results are shown in FIG. 5. Among them, clone 0-2 is a control CAR sample (m971), which could activate NFAT when it was stimulated by positive target cells Raji, 3E09 and JVM2, and the signal intensity was positively correlated with the antigen expression density on target cells; when it was stimulated by negative target cells 3D11, K562 stimulation or in the absence of target cell stimulation, it would not activate NFAT to generate fluorescent signals. Comparing with clone 0-2, clones 28, 36, and 80 were clones specifically recognizing CD22 target cells and activating the NFAT signaling pathway. The rest clones were eliminated.

A total of 10 clones were screened out of 62 clones by the reporter gene method for further function evaluation. The specific steps include preparation of lentiviral vectors, preparation of CAR-T cells, in vitro function evaluation of CAR-T cells and the like.

Example 4. Preparation of Lentiviral Vectors

For the 10 clones obtained in Example 3, the corresponding lentiviral vector preparation process is as follows.

HEK293T cells were thawed and cultured in DMEM medium containing 10% FBS. After 2-3 passages of cell proliferation culture, the cells were seeded into ten layers of cell factories at a density of $6 \times 10^4$ cells/cm$^2$. Plasmid transfection was performed 3 days after cell seeding. The plasmid transfection liquid was formulated with Opti-MEM, and the final concentration of plasmid was 10 μg/mL. The plasmid transfection liquid contained CAR vector plasmid (T), psPAX2 plasmid (P) and pMD2.G plasmid (E) in a ratio of T:P:E=5:3:2. In addition, PEI with a final concentration of 30 μg/mL was added to the plasmid transfection liquid. The mixture was mixed well, and incubated at room temperature for 30 min before use. Each cell factory was transfected with 100 mL of the plasmid transfection liquid.

After 72 h, the supernatant was collected into a centrifuge tube, centrifuged at 3000 g at 4° C. for 10 min, and the supernatant obtained after centrifugation was filtered with a 0.45 μm filter. The filtered supernatant was centrifuged at 27,000 g for 4 h at 4° C. After centrifugation, the supernatant was discarded, and the virus was re-suspended in PBS pre-cooled at 4° C. The re-suspended virus was aliquoted and stored at −80° C. for later use.

Example 5. Preparation of CAR-T Cells

This example uses healthy donor cells to prepare CAR-Ts, and evaluates the functions of the 10 clones obtained in Example 3. An example of the preparation process of CAR-Ts is as follows.

On day 1, about 80 mL of peripheral blood from healthy donors was collected, and separated by using Ficoll to obtain PBMCs, and T cells were obtained by further sorting by CD3 MicroBeads. Sorted T cells were activated using CD3/CD28 Dynabeads. About 24 h after activation (day 2), the lentiviruses (MOI=3) prepared in Example 4 were added for transduction separately, and the T cell density during transduction was about $1.5 \times 10^6$ cells/mL. On day 3, medium change was conducted once for the transduced T cells. After that, the cell density was maintained between $(0.6–2.0) \times 10^6$ cells/mL for culture.

Figure 6:
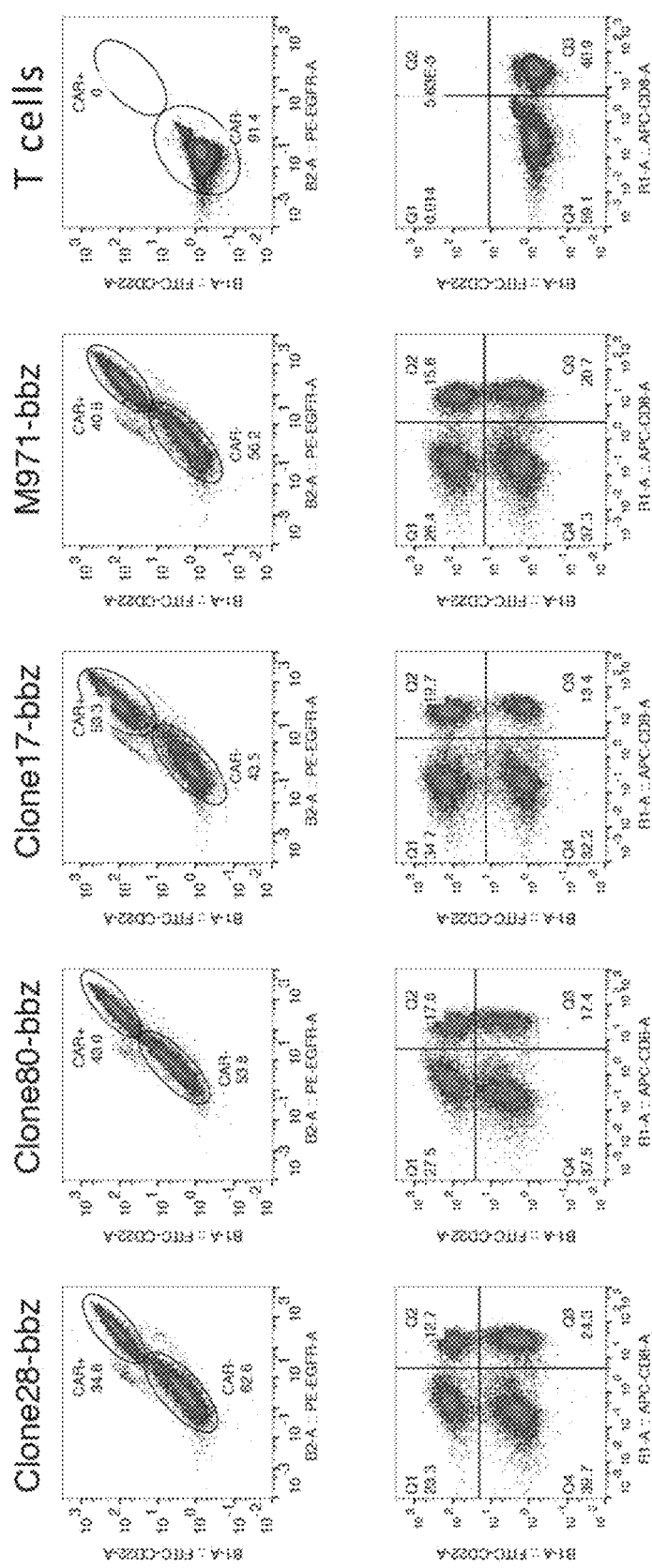
FIG. 6 shows the results of flow cytometric analysis of CAR expression in CD22 CAR-T cell samples from donor SXW (day 6). Cell samples were stained with APC mouse anti-human CD8, PE anti-human EGFR and FITC-CD22 protein.

When the cells were cultured to the 6th or 7th day, the expression of CAR molecules, tEGFR molecules and CD8 on the cell surface was detected by flow cytometry. Here is an example of CAR-T cells prepared from the peripheral blood of donor SXW to illustrate. On day 6 of cell culture, approximately $5 \times 10^5$ cells were removed from each sample individually, and the medium was removed by centrifugation at 500 g. Then, after washing the cells twice with PBS+1% HSA solution, the cells were re-suspended in 50 μL of PBS+1% HSA solution, and 2 μL of CD22-FITC protein (Acro Biosystem, Cat. No. SI2-HF2H6), 2 μL of APC anti-human CD8 antibody (BD, Cat. No. 555369) and 2 μL of PE anti-human EGFR antibody (BioLegend, Cat. No. 352904) were added to each sample individually. The mixtures were mixed well and incubated at 4° C. in the dark for 20 min. After completion of incubation, the cells were washed twice with PBS+1% HSA solution again, re-suspended in 200 μL of PBS+1% HSA solution, and then loaded onto the instrument for testing. Part of the test results are shown in FIG. 6 and Table 3. Except for the control T cells, all samples could express both EGFR and CAR molecules, the CAR molecules could normally bind to CD22 protein, the CAR positive rate (CAR %) was between 34.6% and 53.3%, and the CAR molecules could be expressed normally on the CD8-positive cell population.

TABLE 3

Flow cytometry data of CAR-T samples prepared from donor SXW cells.

| Clone ID | CAR % | CD8+ % | CAR % in CD8+ population |
|---|---|---|---|
| 28 | 34.60% | 37.00% | 34.32% |
| 80 | 43.00% | 35.00% | 50.29% |
| 36 | 42.70% | 37.50% | 42.67% |
| 27 | 38.10% | 39.80% | 36.93% |
| 17 | 53.30% | 33.10% | 59.52% |
| 26 | 47.90% | 34.70% | 45.24% |
| 0-2 (m971) | 40.80% | 36.30% | 42.98% |
| T cells | N/A | 40.91% | N/A |

Example 6. In Vitro Function Evaluation of CAR-T Cells

The CAR-T cells prepared in Example 5, after cultured for 8 to 12 days, were subjected to in vitro function evaluation using two methods: CD107a degranulation experiment (CD107a degranulation assay) and in vitro cell killing experiment (in vitro cytotoxicity assay). Their working principles and screening criteria are as follows.

6.1 CD107a Degranulation Assay

Working Principle

CD107a is a marker for intracellular microvesicles, and CD107a on the cell membrane increases after granzyme-loaded microvesicles fuse with the cell membrane, and when its recovery is blocked by monesin (purchased from BioLegend), it can quantitatively reflect the strength of microvesicle release [6]. Therefore, when CAR-T cells are stimulated by target cell surface antigens to undergo degranulation effect, the positive rate of CD107a on the surface of CAR-T cells can be detected by flow cytometry to determine the activation of CAR-T cells.

Operation Steps

1) Centrifuge the CD22 positive and negative target cells separately at room temperature and 300 g for 5 min; discard the supernatant, and re-suspend the cells in T cell culture medium to $2 \times 10^5$ cells/mL;
2) According to the CAR positive rate and E:T value (usually 0.3:1) of the CAR-T cells to be tested, re-suspend the CAR-T cells to an appropriate density, and add monensin and PE/Cy7 mouse anti-human CD107a antibody;
3) In a U-bottom 96-well plate, add 100 μL/well CAR-T cells to be tested and 100 μL/well target cells individually, mix well, and then place them in an incubator (37° C., 5% CO₂) for incubation 3 h;
4) After completion of incubation, centrifuge at 4° C. and 600 g for 5 min, discard the supernatant, and wash the cells twice with 200 μL/well DPBS+1% HSA;
5) re-suspend the cells with 20 μL/well DPBS+1% HSA, add APC mouse anti-human CD8 antibody and Alexa Fluor 488 anti-human EGFR antibody (or FITC-CD22 protein), mix the cells well and incubate them on ice in the dark for 20 min; and
6) After completion of incubation, wash the cells 3 times with 200 μL/well DPBS+1% HSA, and then re-suspend the cells with 200 L/well DPBS+1% HSA for flow cytometry.

Screening Criteria

CD22 positive target cells can effectively activate CAR-T cells (in the CD8⁺/CAR⁺ cell population, the proportion of CD107a positive cells is high). In the absence of target cell stimulation or CD22-negative target cell stimulation, the CD107a-positive proportion is low in the CD8⁺/CAR⁺ cell population.

Results

Figure 7:
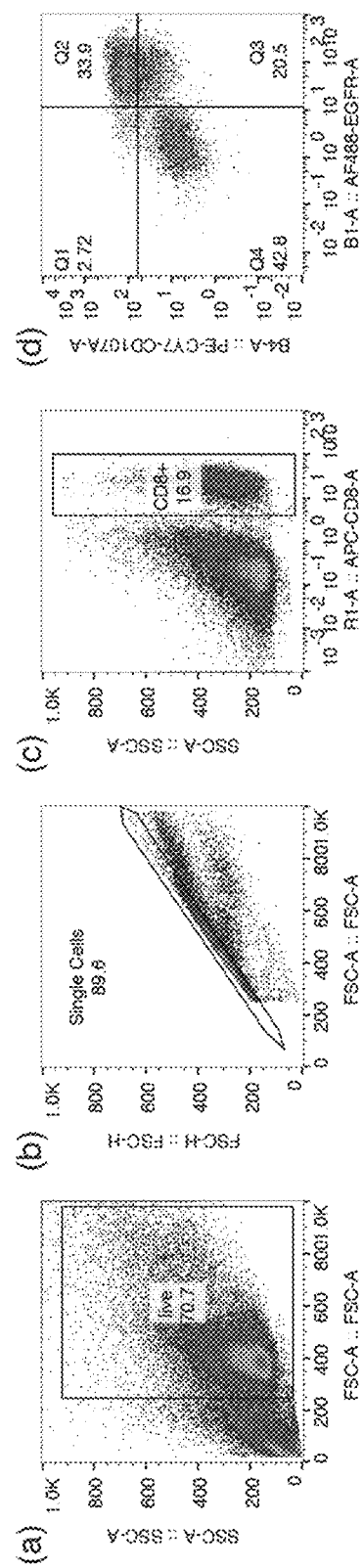
FIG. 7 shows the data analysis process of CD107a degranulation assay of CD22 CAR-T cell samples from donor SXW. Taking the data of clone 80 and REH cells co-incubated samples as an example, viable cells were first selected from the SSC vs FSC scatterplot (a), then monodisperse cells were selected from the viable cells (b), then CD8-positive cells were selected from the monodisperse cells (c), and finally the CD107a positive rate in the population of EGFR-positive cells (i.e., CAR-positive cells) was analyzed in the CD8-positive cell population (d).

CAR-T samples from donor SXW were subjected to CD107a degranulation assay on day 8. The CD22 positive target cells used in the CD107a degranulation assay were Raji. NALM6, REH, and JVM2, and the negative target cells were Jurkat, U266, HEK293, Karpas-299, K562, and 3D11, wherein 3D11 was the prepared CD22 knockout/knockdown Raji cell. An example of the CD107a degranulation assay data analysis is shown in FIG. 7. First, in the SSC vs FSC scatterplot (FIG. 7a), the viable cell population was selected. Then in the FSC-H vs FSC-A scatterplot of the live cell population (FIG. 7b), monodisperse cells were selected. CD8-positive cells were then selected in the SSC vs APC-CD8 scatterplot of the monodisperse cell population (FIG. 7c). Finally, in the PECy7-CD107a vs AF488-EGFR scatterplot of CD8-positive cells (FIG. 7d), the positive rate of CD107a in the EGFR-positive cell population was analyzed. The positive rate of CD107a was calculated by the ratio of Q2/(Q2+Q3) in FIG. 7d, and the calculation results are shown in Table 2. In addition, since there was no EGFR in T cells, its CD107a positive rate was calculated by Q1/(Q1+Q2) in FIG. 7d.

All cloned CAR-T cells was subjected to degranulation effect when stimulated by positive target cells. Among them, the degranulation effect of clone 80, clone 28, clone 36 and clone 17 was similar to that of the control CAR (m971-bbz). However, under stimulation by CD22-negative target cells, clone 36 had an obvious degranulation effect, so clone 36 may have the problem of non-specific activation and was eliminated.

In addition, the down-regulated expression of CD22 antigen on the surface of tumor cells is one of the main reasons for recurrence after CD22 CAR-T cell therapy 181. Therefore, we hope to obtain CAR molecules that can recognize and kill tumor cells with low CD22 expression. Since 3D11 is a CD22 knockout/knockdown Raji cell, clone 80, clone 28, clone 17 and m971 all had a small degranulation effect under stimulation by 3D11. The strength of the effect indicates the ability of a clone to recognize low-density targets. Therefore, clone 80 may have better low-density target recognition ability.

in T cell complete medium to $2 \times 10^5$ cells/mL; add 100 μL/well target cells to 96 well plates with transparent bottom separately;

2) According to the CAR positive rate and E:T value (usually 2:1, 1:1, and 0.5:1) of the CAR-T cells to be tested, add 100 μL/well CAR-T cells to the 96-well plate separately, and after well mixing with the target cells, put them in an incubator (3° C., 5% $CO_2$) to incubate for 24 h;
3) After completion of incubation, centrifuge the cells at room temperature and 800 g for 5 min, collect 100 μL/well supernatant as a reserved sample for cytokine detection (stored at −80° C.); and
4) Use a luciferase detection kit to detect the luciferase activity of the remaining cells after sample reservation in each well.

Screening Criteria

CAR-T cells can effectively kill CD22-positive target cells, and have no non-specific killing effect on CD22-negative target cells.

Results

CAR-T samples from donor SXW were subjected to in vitro cell killing experiment on day 8. Two CD22-positive

TABLE 4

The positive rate of CD107a in the CD8+/CAR+ cell population of CAR-T samples from donor SXW under stimulation by different target cells.

| | | | | | | | | | | | |
|---|---|---|---|---|---|---|---|---|---|---|---|
| | | | | | Target cell | | | | | | |
| Clone ID | raji | REH | NALM6 | JVM2 | 3D11 | K562 | Jurkat | HEK293 | U266 | Karpas-299 | Buffer |
| 28 | 54.82% | 70.39% | 73.46% | 43.50% | 16.90% | 2.12% | 1.30% | 2.22% | 3.78% | 2.16% | 2.32% |
| 80 | 39.69% | 62.32% | 59.71% | 32.82% | 18.88% | 2.16% | 1.47% | 2.45% | 3.64% | 2.93% | 3.14% |
| 36 | 48.80% | 67.86% | 67.39% | 49.09% | 29.70% | 20.27% | 20.84% | 15.44% | 27.32% | 29.03% | 29.60% |
| 27 | 61.89% | 58.81% | 70.25% | 26.57% | 1.55% | 1.28% | 0.94% | 1.64% | 2.87% | 1.42% | 2.74% |
| 17 | 55.53% | 64.80% | 64.75% | 44.30% | 14.94% | 1.88% | 2.69% | 1.54% | 4.58% | 2.64% | 2.66% |
| 26 | 9.61% | 28.70% | 13.12% | 10.74% | 0.52% | 1.03% | 0.78% | 1.06% | 1.83% | 1.13% | 1.68% |
| m971 | 53.87% | 73.53% | 72.00% | 44.91% | 15.93% | 2.36% | 1.51% | 1.22% | 2.84% | 1.91% | 1.83% |
| T cells | 1.94% | 1.98% | 2.16% | 1.63% | 1.90% | 1.49% | 2.02% | 2.28% | 3.53% | 2.56% | 3.93% |

6.2 In Vitro Cell Killing Experiment

Working Principle

In the evaluation of the antigen-specific killing ability of CAR-T cells, NALM6-ffLuc was used as CD22 positive target cells, and K562-ffLuc or Jurkat-ffLuc cells were used as CD22 negative target cells. These target cells are cell lines stably expressing firefly luciferase, which are obtained by lentiviral transduction.

In the in vitro cell killing assay, CAR-T cells and target cells were co-incubated with different effector-target ratios (E:T) individually. When target cells are killed by CAR-T cells, luciferase is released and quickly inactivated (firefly luciferase has a half-life of about 0.5 h [7]). If the target cells are not killed or inhibited by CAR-T cells, more luciferases will be produced as the target cells proliferate and continue to express luciferase. Therefore, the killing of target cells by CAR-T can be detected by the activity of luciferase.

Operation steps

1) Centrifuge NALM6-ffLuc and K562-ffLuc cells at room temperature and 300 g for 5 min separately, discard the supernatant, and then re-suspended the cells target cells, NALM6-ffLuc and REH-ffLuc, and one CD22-negative target cell, K562-ffLuc, were used in the experiment.

Figure 8:
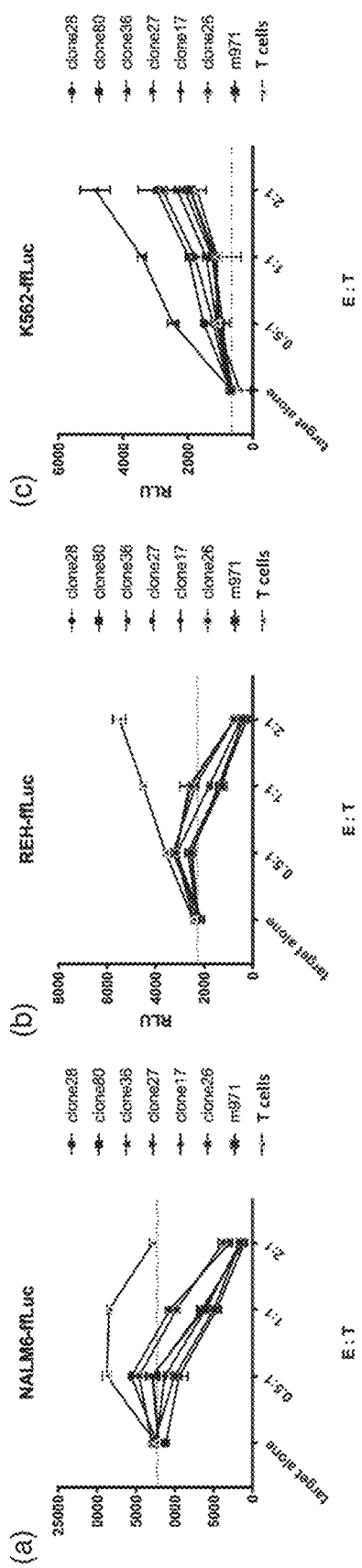
FIG. 8 shows the chemiluminescence results detected after 17 h co-incubation of CD22 CAR-T cell samples from donor SXW with different target cells. Chemiluminescence values were positively correlated with the number of target cells.

The results are shown in Table 5 and FIG. 8a. When the effector-target ratio (E:T) was 1:1 or 2:1, all CAR-T samples could kill CD22-positive target cells NALM6-ffLuc. Among them, m971, clone 80 and clone 17 showed strong killing ability. In the control T cell sample, there was no obvious non-specific killing.

As shown in Table 6 and FIG. 8b, all CAR-T samples could kill CD22-positive target cells REH-ffLuc when the E:T value was 2:1. Among them, m971, clone 80 and clone 17 showed strong killing ability. When the E:T value was 1:1, m971, clone 80, clone 36 and clone 17 still had certain killing ability. However, at an E:T value of 0.5:1, all samples were unable to effectively kill target cells REH-ffLuc. None of the control T cell samples showed non-specific killing, and the target cells REH-ffLuc proliferated rapidly.

As shown in Table 7 and FIG. 8c, all CAR-T/T samples did not kill the CD22-negative target cell K562-ffLuc, and K562-ffLuc showed rapid proliferation due to the MLR effect.

TABLE 5

Detection of in vitro cell killing efficiency after co-incubation of CAR-T samples of donor SXW and target cells NALM6-ffLuc for 17 h. wherein negative values represent target cell proliferation.

| Clone ID | Effector-target ratio (E:T) | | |
|---|---|---|---|
| | 2:1 | 1:1 | 0.5:1 |
| 28 | 76.1 ± 2.3% | 13.8 ± 4.8% | −26.8 ± 1.3% |
| 80 | 90.5 ± 0.8% | 58.5 ± 5.1% | 15.3 ± 9.9% |
| 36 | 88.0 ± 0.4% | 48.4 ± 6.8% | −6.3 ± 5.6% |
| 27 | 90.1 ± 0.5% | 45.5 ± 4.9% | −6.5 ± 7.0% |
| 17 | 86.8 ± 1.8% | 51.1 ± 3.6% | 8.7 ± 1.2% |
| 26 | 70.7 ± 4.8% | 24.5 ± 3.4% | −12.9 ± 6.8% |
| m971 | 87.1 ± 1.2% | 60.7 ± 1.7% | 21.0 ± 3.5% |
| T cells | −3.1 ± 3.7% | −48.4 ± 2.0% | −50.8 ± 4.4% |

TABLE 6

Detection of in vitro cell killing efficiency after co-incubation of CAR-T samples of donor SXW and target cells REH-ffLuc for 17 h. wherein negative values represent target cell proliferation.

| Clone ID | Effector-target ratio (E:T) | | |
|---|---|---|---|
| | 2:1 | 1:1 | 0.5:1 |
| 28 | 63.8 ± 4.1% | −23.9 ± 18.1% | −50.1 ± 5.4% |
| 80 | 89.0 ± 1.4% | 40.2 ± 7.4% | −18.2 ± 2.3% |
| 36 | 78.9 ± 1.8% | 21.5 ± 2.1% | −35.8 ± 2.2% |
| 27 | 64.3 ± 6.2% | −12.0 ± 5.3% | −55.7 ± 3.1% |
| 17 | 83.1 ± 0.3% | 36.8 ± 2.3% | −11.2 ± 2.8% |
| 26 | 68.4 ± 4.7% | −5.3 ± 3.4% | −30.4 ± 5.4% |
| m971 | 80.9 ± 2.9% | 44.3 ± 9.1% | −12.0 ± 8.3% |
| T cells | −124.2 ± 10.9% | −83.8 ± 3.8% | −46.1 ± 3.4% |

TABLE 7

Detection of in vitro cell killing efficiency after co-incubation of CAR-T samples of donor SXW and target cells K562-ffLuc for 17 h. wherein negative values represent target cell proliferation.

| Clone ID | Effector-target ratio (E:T) | | |
|---|---|---|---|
| | 2:1 | 1:1 | 0.5:1 |
| 28 | −233.5 ± 25.4% | −99.0 ± 20.3% | −60.2 ± 10.7% |
| 80 | −334.6 ± 83.5% | −189.9 ± 14.7% | −122.2 ± 4.1% |
| 36 | −620.0 ± 68.4% | −405.7 ± 20.0% | −264.2 ± 24.8% |
| 27 | −236.1 ± 80.2% | −106.6 ± 15.4% | −60.7 ± 7.2% |
| 17 | −177.0 ± 24.2% | −72.8 ± 10.1% | −33.9 ± 7.8% |
| 26 | −286.2 ± 19.7% | −147.5 ± 6.2% | −69.0 ± 9.2% |
| m971 | −179.5 ± 15.7% | −65.1 ± 25.3% | −55.3 ± 13.9% |
| T cells | −328.7 ± 70.9% | −172.6 ± 181.5% | −179.2 ± 100.0% |

The results of Example 3 (preliminary screening by reporter gene method) and Example 6 (in vitro function evaluation of CAR-T cells) together showed that the CAR-T cells generated by using clone 80, clone 28 and clone 17 showed good in vitro cell functions.

Example 7. In Vivo Tumor Inhibition Experiments in Tumor-Bearing Animal Models Working Principle Using the immunodeficient mouse NPG bearing the human acute lymphocytic leukemia cells, Nalm6 cells, which specifically express CD22, as the experimental system, the method in Example 5 to prepare CAR-T cell samples was evaluated, and the efficacy of clone 80, clone 28 and clone 17 in animals was evaluated.

Compared with NOD/SCID mice, NPG mice have the gamma chain of the IL-2 receptor knocked out. IL-2 receptor is the co-receptor subunit of IL-2, IL-4, IL-7, IL-9, IL-15 and IL-21. The knockout of this gene can further reduce the immune function of mice, especially, almost completely eliminate the vitality of NK cells. Therefore, NPG mice are more suitable recipients for cell or tissue transplantation.

Nalm6 is a cell line stably expressing firefly luciferase. Nalm6 cells will proliferate after being injected into mice through tail vein. D-fluorescein potassium is injected intraperitoneally, and chemiluminescence signals are captured by Bruker small animal imager under isoflurane anesthesia. If the target cells are not killed or inhibited by CAR-T cells, more luminescent signals will be detected as the target cells proliferate to continue express luciferase; sites with specific aggregation of target cells can also be observed by the imaging position of the target cells. Therefore, the killing of target cells by CAR-T in animals can be detected by the intensity of the luminescent signal.

Operation steps
1) Prepare CAR-T cell samples comprising clone 80, clone 28 and clone 17 separately according to the method in Example 5;
2) Select immunodeficient NPG mice, female, 4-5 weeks old, body weight 20±3 g; get NALM6-LUC cells in logarithmic growth phase and inoculate them in NPG mice by tail vein injection, the inoculum size being $1\times10^6$/mouse. After 2 days of tumor cell inoculation, different doses of the test samples were given by tail vein injection, and the grouping scheme is shown in Table 8;
3) On the 3rd, 7th, 12th, 18th and 28th days after administration, inject D-fluorescein potassium intraperitoneally, and capture chemiluminescence signals by Bruker small animal imager under isoflurane anesthesia, and detect tumor growth inhibition by tumor imaging; and
4) On the 3rd, 7th, 14th, 17th, 21st, and 28th days after administration, after anesthesia with isoflurane and after the corneal reflex disappears, collect 0.1 mL of blood from the orbital vein and store the blood with EDTA-2K anticoagulation; and detect the copy number of CARs.

TABLE 8

Grouping scheme of animal model experiment

| Group | Administrated dose ($\times10^8$ CAR + pcs/kg) | Dose ($\times10^6$ CAR + pcs/mouse) | CAR positive rate (%) | Number of mice |
|---|---|---|---|---|
| Vehicle control group | / | / | / | 3 |
| Mock T control group | 3.7 | 7.4 | / | 3 |
| Clone 80 low dose group | 0.25 | 0.5 | 42.8 | 3 |
| Clone 80 high dose group | 1.0 | 2 | 42.8 | 6 |
| Clone 28 group | 1.0 | 2 | 30.2 | 6 |
| Clone 17 group | 1.0 | 2 | 50.6 | 6 |

Results of Animal Experiments
1) Mouse Imaging Results

Figure 9:
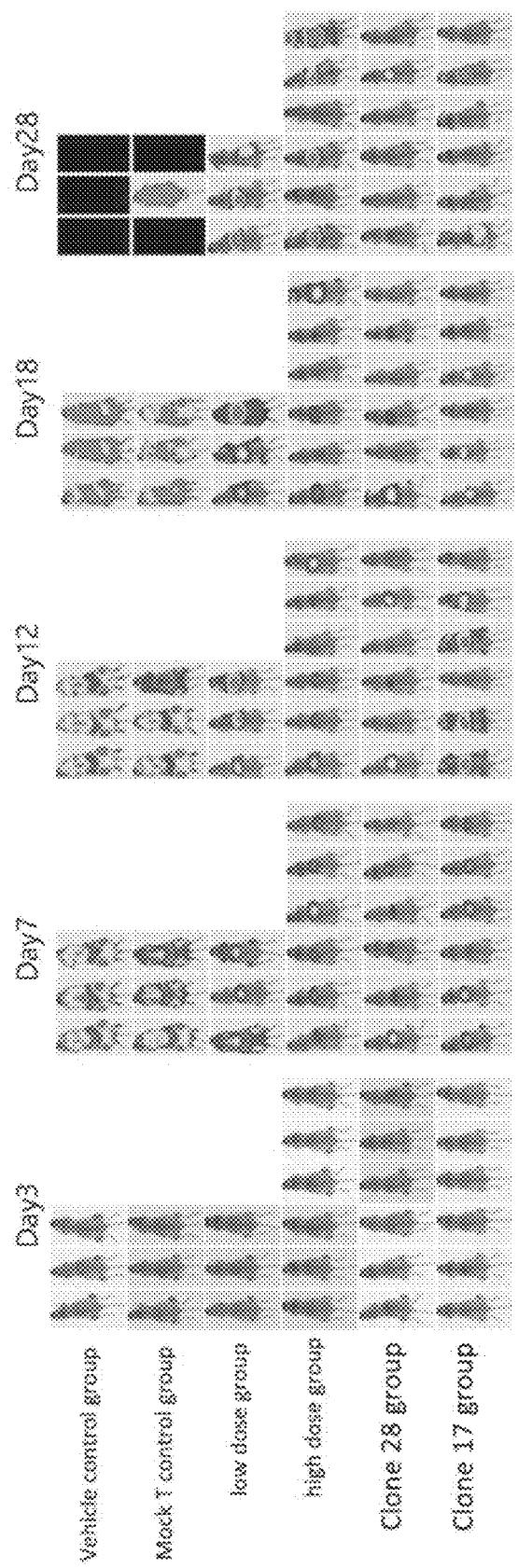
FIG. 9 shows the inhibitory effect of the CAR-T cells prepared by the present invention on tumors in tumor-bearing NPG mice by in vivo luminescence imaging.

As shown in FIG. 9, the tumor cells in the vehicle control group and the MockT control group grew normally, and the model was successful: after D20, the mice in the vehicle control group died due to tumor overload, and the mice in the MockT group showed GvHD before death; the mice in all the administration groups had no abnormality in the clinical indicators; the inhibition of tumor growth phenomenon was observed in all the clone 80 low-dose and high-dose groups, clone 28 group and clone17 group; CR began to appear on the 12th day in each group, and CR was maintained until D28, the end of the observation period; obvious differences in efficacy were observed for different doses of clone 80, and the efficacy was positively correlated with the dose; the clone 28 group had 3/6 CR on D28; and some mice in the clone17 group had tumor cell proliferation on D28.

2) Fluorescence Signal of Tumor Cells

The measured fluorescence signal intensities are shown in Table 9 below.

TABLE 9

Mouse tumor cell imaging fluorescence signal

Luminescent intensity Log 10 (p/s/cm/sr)

| Group | Day 0 | Day 3 | Day 7 | Day 12 | Day 18 | Day 28 |
|---|---|---|---|---|---|---|
| Vehicle control group | 6.32 ± 0.27 | 7.51 ± 0.18 | 9.62 ± 0.04 | 11.2 ± 0.03 | 11.61 ± 0.08 | / |
| Mock T control group | 6.32 ± 0.21 | 7.22 ± 0.19 | 9.27 ± 0.23 | 10.8 ± 0.54 | 11.45 ± 0.07 | 11.59 |
| Clone 80 low dose group | 6.27 ± 0.25 | 6.98 ± 0.39 | 8.16 ± 0.22 | 8.78 ± 0.41 | 9.43 ± 0.64 | 9.88 ± 0.11 |
| Clone 80 high dose group | 6.11 ± 0.49 | 6.88 ± 0.32 | 7.8 ± 0.27 | 7.7 ± 0.71 | 7.95 ± 1.28 | 9.52 ± 1.31 |
| Clone 28 group | 6.2 ± 0.48 | 6.71 ± 0.47 | 7.43 ± 0.59 | 7.52 ± 1.11 | 8.37 ± 0.76 | 8.36 ± 0.77 |
| Clone 17 group | 6.15 ± 0.43 | 6.71 ± 0.45 | 7.78 ± 0.51 | 8.41 ± 1.5 | 9.71 ± 0.96 | 10.56 ± 0.4 |

Figure 10:
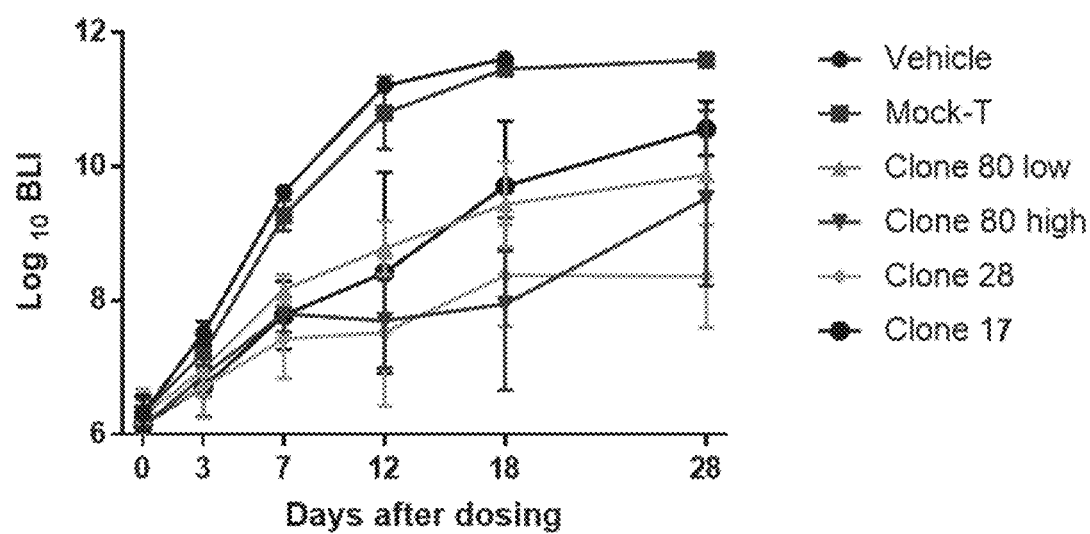
FIG. 10 shows the change curve of fluorescence intensity in tumor-bearing NPG mice.

The data in the above table is plotted, and the results are shown in FIG. 10. In the vehicle control group and the Mock-T group, the tumor signal gradually increased with time, and there was no significant difference between the two groups, the tumor signal decrease was observed in the clone 80 low-dose and high-dose groups, the clone 28 group and the clone 17 group; there were obvious differences in tumor signal for the clone 80 groups with different doses, at the same time point, and the signal in the high-dose group was significantly lower than that in the low-dose group; the tumor signal in the clone 28 group was always at a low level, and the tumor signal in the clone 17 group gradually increased after D18.

In conclusion, obvious efficacy was observed in the Nalm6 tumor-bearing mouse model in all the clone 80 group, clone 28 group and clone 17 group. Of them, the clone 80 group and clone 28 group had better tumor inhibition than the clone 17 group.

Some of the amino acid or nucleic acid sequences mentioned herein are as follows:

```
(clone 17 LCDR1 amino acid sequence)
                                               SEQ ID NO: 1
RASQSISSWLA (clone 17 LCDR2 amino acid sequence)
                                               SEQ ID NO: 2
KASSLES (clone 17 LCDR3 amino acid sequence)
                                               SEQ ID NO: 3
QQYERFPWT (clone 17 HCDR1 amino acid sequence)
                                               SEQ ID NO: 4
FTFSSYAMS (clone 17 HCDR2 amino acid sequence)
                                               SEQ ID NO: 5
```

-continued

AISGSGGSTYYADSVKG (clone 17 HCDR3 amino acid sequence)
SEQ ID NO: 6
AKVGISSLHGMDV (clone 28 LCDR1 amino acid sequence)
SEQ ID NO: 7
RASQSISSWLA (clone 28 LCDR2 amino acid sequence)
SEQ ID NO: 8
DASSLES (clone 28 LCDR3 amino acid sequence)
SEQ ID NO: 9
QQANTYSPT (clone 28 HCDR1 amino acid sequence)
SEQ ID NO: 10
GSISSYYWS (clone 28 HCDR2 amino acid sequence)
SEQ ID NO: 11
RIYTSGSTNYNPSLKS (clone 28 HCDR3 amino acid sequence)
SEQ ID NO: 12
ARDLYRDGMDV (clone 80 LCDR1 amino acid sequence)
SEQ ID NO: 13
RASQSVSSSYLA (clone 80 LCDR2 amino acid sequence)
SEQ ID NO: 14
GASSRAT (clone 80 LCDR3 amino acid sequence)
SEQ ID NO: 15
QQAGLFPYT (clone 80 HCDR1 amino acid sequence)
SEQ ID NO: 16
GSISSSNWWS (clone 80 HCDR2 amino acid sequence)
SEQ ID NO: 17
EIYHSGSTNYNPSLKS (clone 80 HCDR3 amino acid sequence)
SEQ ID NO: 18
ARLPGYESAFDI (clone 17 VL amino acid sequence)
SEQ ID NO: 19
DIQMTQSPSTLSASVGDRVTITCRASQSISSWLAWYQQKPGKAPKLLIYKASSLESGV
PSRFSGSGSGTEFTLTISSLQPDDFATYYCQQYERFPWTFGGGTKVEIK (clone 17 VH amino acid sequence)
SEQ ID NO: 20
EVQLLESGGGLVQPGGSLRLSCAASGFTFSSY AMSWVRQAPGKGLEWVSAISGSGGS
TYYADSVKGRFTISRDNSKNTLYLQMNSLRAEDTAVYYCAKVGISSLHGMDVWGQGTT
VTVSS (clone 28 VL amino acid sequence)
SEQ ID NO: 21
DIQMTQSPSTLSASVGDRVTITCRASQSISSWLAWYQQKPGKAPKLLISDASSLESGV
PSRFSGSGSGTEFTLTISSLQPDDFATYYCQQANTYSPTFGGGTKVEIK (clone 28 VH amino acid sequence)
SEQ ID NO: 22
QVQLQESGPGLVKPSETLSLTCTVSGGSISSYYWSWIRQPAGKGLEWIGRIYTSGSTN
YNPSLKSRVTMSVDTSKNQFSLKLSSVTAADTAVYYCARDLYRDGMDVWGQGTTVTV
SS (clone 80 VL amino acid sequence)
SEQ ID NO: 23
EIVLTQSPGTLSLSPGERATLSCRASQSVSSSYLAWYQQKPGQAPRLLIYGASSRATGI
PDRFSGSGSGTDFTLTISRLEPEDFAVYYCQQAGLFPYTFGGGTKVEIK -continued (clone 80 VH amino acid sequence)
SEQ ID NO: 24
QVQLQESGPGLVKPSGTLSLTCAVSGGSISSSNWWSWVRQPPGKGLEWIGEIYHSGS
TNYNPSLKSRVTISVDKSKNQFSLKLSSVTAADTAVYYCARLPGYESAFDIWGQGTMVT
VSS (clone 17 scFv amino acid sequence)
SEQ ID NO: 25
EVQLLESGGGLVQPGGSLRLSCAASGFTFSSYAMSWVRQAPGKGLEWVSAISGSGGS
TYYADSVKGRFTISRDNSKNTLYLQMNSLRAEDTAVYYCAKVGISSLHGMDVWGQGTT
VTVSSGGGGSGGGGSGGGGSDIQMTQSPSTLSASVGDRVTITCRASQSISSWLAWYQQK
PGKAPKLLIYKASSLESGVPSRFSGSGSGTEFTLTISSLQPDDFATYYCQQYERFPWTFGG
GTKVEIK (clone 28 scFv amino acid sequence)
SEQ ID NO: 26
QVQLQESGPGLVKPSETLSLTCTVSGGSISSYYWSWIRQPAGKGLEWIGRIYTSGSTN
YNPSLKSRVTMSVDTSKNQFSLKLSSVTAADTAVYYCARDLYRDGMDVWGQGTTVTV
SSGGGGSGGGGSGGGGSDIQMTQSPSTLSASVGDRVTITCRASQSISSWLAWYQQKPGK
APKLLISDASSLESGVPSRFSGSGSGTEFTLTISSLQPDDFATYYCQQANTYSPTFGGGTK
VEIK (clone 80 scFv amino acid sequence)
SEQ ID NO: 27
QVQLQESGPGLVKPSGTLSLTCAVSGGSISSSNWWSWVRQPPGKGLEWIGEIYHSGS
TNYNPSLKSRVTISVDKSKNQFSLKLSSVTAADTAVYYCARLPGYESAFDIWGQGTMVT
VSSGGGGSGGGGSGGGGSEIVLTQSPGTLSLSPGERATLSCRASQSVSSSYLAWYQQKPG
QAPRLLIYGASSRATGIPDRFSGSGSGTDFTLTISRLEPEDFAVYYCQQAGLFPYTFGGGT
KVEIK (M971 scFv amino acid sequence)
SEQ ID NO: 28
QVQLQQSGPGLVKPSQTLSLTCAISGDSVSSNSAAWNWIRQSPSRGLEWLGRTYYRS
KWYNDYAVSVKSRITINPDTSKNQFSLQLNSVTPEDTAVYYCAREVTGDLEDAFDIWGQ
GTMVTVSSGGGGSGGGGSGGGGSDIQMTQSPSSLSASVGDRVTITCRASQTIWSYLNWY
QQRPGKAPNLLIYAASSLQSGVPSRFSGRGSGTDFTLTISSLQAEDFATYYCQQSYSIPQT
FGQGTKLEIK (T2A amino acid sequence)
SEQ ID NO: 29
EGRGSLLTCGDVEENPGP (CD8α signal peptide amino acid sequence)
SEQ ID NO: 30
MALPVTALLLPLALLLHAARP (CD8α hinge region and transmem-
brane region amino acid sequences)
SEQ ID NO: 31
FVPVFLPAKPTTTPAPRPPTPAPTIASQPLSLRPEACRPAAGGAVHTRGLDFACDIYIW
APLAGTCGVLLLSLVITLYCNHRN (4-1BB costimulatory signaling domain amino acid sequence)
SEQ ID NO: 32
KRGRKKLLYIFKQPFMRPVQTTQEEDGCCRFPEEEEGGCEL (CD3z intracellular signaling domain amino acid sequence)
SEQ ID NO: 33
RVKFSRSADAPAYQQGQNQLYNELNLGRREEYDVLDKRRGRDPEMGGKPRRKNPQ
EGLYNELQKDKMAEAYSEIGMKGERRRGKGHDGLYQGLSTATKDTYDALHMQALPPR (tEGFR amino acid sequence)
SEQ ID NO: 34
MLLLVTSLLLCELPHPAFLLIPRKVCNGIGIGEFKDSLSINATNIKHFKNCTSISGDLHIL
PVAFRGDSFTHTPPLDPQELDILKTVKEITGFLLIQAWPENRTDLHAFENLEIIRGRTKQH
GQFSLAVVSLNITSLGLRSLKEISDGDVIISGNKNLCYANTINWKKLFGTSGQKTKIISNRG
ENSCKATGQVCHALCSPEGCWGPEPRDCVSCRNVSRGRECVDKCNLLEGEPREFVENSE
CIQCHPECLPQAMNITCTGRGPDNCIQCAHYIDGPHCVKTCPAGVMGENNTLVWKYAD
AGHVCHLCHPNCTYGCTGPGLEGCPTNGPKIPSIATGMVGALLLLLVVALGIGLFM (clone 17 CAR amino acid sequence)
SEQ ID NO: 35
MALPVTALLLPLALLLHAARPEVQLLESGGGLVQPGGSLRLSCAASGFTFSSYAMSW
VRQAPGKGLEWVSAISGSGGSTYYADSVKGRFTISRDNSKNTLYLQMNSLRAEDTAVY
YCAKVGISSLHGMDVWGQGTTVTVSSGGGGSGGGGSGGGGSDIQMTQSPSTLSASVGD
RVTITCRASQSISSWLAWYQQKPGKAPKLLIYKASSLESGVPSRFSGSGSGTEFTLTISSLQ
PDDFATYYCQQYERFPWTFGGGTKVEIKFVPVFLPAKPTTTPAPRPPTPAPTIASQPLSLR
PEACRPAAGGAVHTRGLDFACDIYIWAPLAGTCGVLLLSLVITLYCNHRNKRGRKKLLY
IFKQPFMRPVQTTQEEDGCSCRFPEEEEGGCELRVKFSRSADAPAYQQGQNQLYNELNL
GRREEYDVLDKRRGRDPEMGGKPRRKNPQEGLYNELQKDKMABAYSEIGMKGERRRG
KGHDGLYQGLSTATKDTYDALHMQALPPRGSEGRGSLLTCGDVEENPG -continued (clone 28 CAR amino acid sequence)
SEQ ID NO: 36
MALPVTALLLPLALLLHAARPQVQLQESGPGLVKPSETLSLTCTVSGGSISSYYWSWI
RQPAGKGLEWIGRIYTSGSTNYNPSLKSRVTMSVDTSKNQFSLKLSSVTAADTAVYYCA
RDLYRDGMDVWGQGTTVTVSSGGGGSGGGGSGGGGSDIQMTQSPSTLSASVGDRVTIT
CRASQSISSWLAWYQQKPGKAPKLLISDASSLESGVPSRFSGSGSGTEFTLTISSLQPDDF
ATYYCQQANTYSPTFGGGTKVEIKFVPVFLPAKPTTTPAPRPPTP APTIASQPLSLRPEAC
RPAAGGAVHTRGLDFACDIYIWAPLAGTCGVLLLSLVITLYCNHRNKRGRKKLLYIFKQ
PFMRPVQTTQEEDGCSCRFPEEEEGGCELRVKFSRSADAPAYQQGQNQLYNELNLGRRE
EYDVLDKRRGRDPEMGGKPRRKNPQEGLYNELQKDKMAEAYSEIGMKGERRRGKGHD
GLYQGLSTATKDTYDALHMQALPPRGSGEGRGSLLTCGDVEENPG (clone 80 CAR amino acid sequence)
SEQ ID NO: 37
MALPVTALLLPLALLLHAARPQVQLQESGPGLVKPSGTLSLTCAVSGGSISSSNWWS
WVRQPPGKGLEWIGEIYHSGSTNYNPSLKSRVTISVDKSKNQFSLKLSSVTAADTAVYY
CARLPGYESAFDIWGQGTMVTVSSGGGGSGGGGGGGGSEIVLTQSPGTLSLSPGERAT
LSCRASQSVSSSYLAWYQQKPGQAPRLLIYGASSRATGIPDRFSGSGSGTDFTLTISRLEP
EDFAVYYCQQAGLFPYTFGGGTKVEIKFVPVFLPAKPTTTPAPRPPTPAPTIASQPLSLRP
EACRPAAGGAVHTRGLDFACDIYIWAPLAGTCGVLLLSLVITLYCNHRNKRGRKKLLYI
FKQPFMRPVQTTQEEDGCSCRFPEEEEGGCELRVKFSRSADAPAYQQGQNQLYNELNLG
RREEYDVLDKRRGRDPEMGGKPRRKNPQEGLYNELQKDKMAEAYSEIGMKGERRRGK
GHDGLYQGLSTATKDTYDALHMQALPPRGSGEGRGSLLTCGDVEENPG (clone 17 scFv nucleotide sequence)
SEQ ID NO: 38
GAGGTGCAGCTGTTGGAGTCTGGGGGAGGCTTGGTACAGCCTGGGGGGTCCCTG
AGACTCTCCTGTGCAGCCTCTGGATTCACCTTTAGCAGCTATGCCATGAGCTGGGTCC
GCCAGGCTCCAGGGAAGGGGCTGGAGTGGGTCTCAGCTATTAGTGGTAGTGGTGGT
AGCACATACTACGCAGACTCCGTGAAGGGCCGGTTCACCATCTCCAGAGACAATTCC
AAGAACACGCTGTATCTGCAAATGAACAGCCTGAGAGCCGAGGACACGGCGGTGTA
CTACTGCGCCAAGGTAGGAATATCCAGCTTACACGGAATGGACGTATGGGGCCAGG
GAACAACTGTCACCGTCAGCTCAGGTGGCGGGGGCAGCGGCGGAGGCGGATCCGGA
GGCGGAGGGAGTGACATCCAGATGACCCAGTCTCCTTCCACCCTGTCTGCATCTGTA
GGAGACAGAGTCACCATCACTTGCCGGGCCAGTCAGAGTATTAGTAGCTGGTTGGCC
TGGTATCAGCAGAAACCAGGGAAAGCCCCTAAGCTCCTGATCTATAAAGCCTCCAGT
TTGGAAAGTGGGGTCCCATCAAGGTTCAGCGGCAGTGGATCTGGGACAGAATTCACT
CTCACCATCAGCAGCCTGCAGCCTGATGATTTTGCAACTTATTACTGCCAGCAGTAC
GAACGCTTCCCTTGGACTTTTGGCGGAGGGACCAAGGTTGAGATCAAA (clone 28 scFv nucleotide sequence)
SEQ ID NO: 39
CAGGTGCAGCTGCAGGAGTCGGGCCCAGGACTGGTGAAGCCTTCGGAGACCCTG
TCCCTCACCTGCACTGTCTCTGGTGGCTCCATCAGTAGTTACTACTGGAGCTGGATCC
GGCAGCCCGCCGGGAAGGGACTGGAGTGGATTGGGCGTATCTATACCAGTGGGAGC
ACCAACTACAACCCCTCCCTCAAGAGTCGAGTCACCATGTCAGTAGACACGTCCAAG
AACCAGTTCTCCCTGAAGCTGAGCTCTGTGACCGCCGCGGACACGGCGGTGTACTAC
TGCGCCAGAGACTTGTACAGAGATGGAATGGACGTATGGGGCCAGGGAACAACTGT
CACCGTCAGCTCAGGTGGCGGGGGCAGCGGCGGAGGCGGATCCGGAGGCGGAGGG
AGTGACATCCAGATGACCCAGTCTCCTTCCACCCTGTCTGCATCTGTAGGAGACAGA
GTCACCATCACTTGCCGGGCCAGTCAGAGTATTAGTAGCTGGTTGGCCTGGTATCAG
CAGAAACCAGGGAAAGCCCCTAAGCTCCTGATCTCCGATGCCTCCAGTTTGGAAAGT
GGGGTCCCATCAAGGTTCAGCGGCAGTGGATCTGGGACAGAATTCACTCTCACCATC
AGCAGCCTGCAGCCTGATGATTTTGCAACTTATTACTGCCAGCAGGCCAATACCTAC
TCTCCTACTTTTGGCGGAGGGACCAAGGTTGAGATCAAA (clone 80 scFv nucleotide sequence)
SEQ ID NO: 40
CAGGTGCAGCTGCAGGAGTCGGGCCCAGGACTGGTGAAGCCTTCGGGGACCCTG
TCCCTCACCTGCGCTGTCTCTGGTGGCTCCATCAGCAGTAGTAACTGGTGGAGTTGG
GTCCGCCAGCCCCCAGGGAAGGGGCTGGAGTGGATTGGGGAAATCTATCATAGTGG
GAGCACCAACTACAACCCGTCCCTCAAGAGTCGAGTCACCATATCAGTAGACAAGT
CCAAGAACCAGTTCTCCCTGAAGCTGAGCTCTGTGACCGCCGCGGACACGGCGGTGT
ACTACTGCGCCAGACTTCCTGGATACGAGTCAGCTTTCGACATATGGGGTCAGGGTA
CAATGGTCACCGTCAGCTCAGGTGGCGGGGGCAGCGGCGGAGGCGGATCCGGAGGC
GGAGGGAGTGAAATTGTGTTGACGCAGTCTCCAGGCACCCTGTCTTTGTCTCCAGGG
GAAAGAGCCACCCTCTCCTGCAGGGCCAGTCAGAGTGTTAGCAGCAGCTACTTAGCC
TGGTACCAGCAGAAACCTGGCCAGGCTCCCAGGCTCCTCATCTATGGTGCATCCAGC
AGGGCCACTGGCATCCCAGACAGGTTCAGTGGCAGTGGGTCTGGGACAGACTTCACT
CTCACCATCAGCAGACTGGAGCCTGAAGATTTTGCAGTGTATTACTGTCAGCAGGCC
GGACTCTTCCCTTACACTTTTGGCGGAGGGACCAAGGTTGAGATCAAA (M971 scFv nucleotide sequence)
SEQ ID NO: 41
CAGGTGCAGCTCCAGCAGAGCGGCCCCGGCCTGGTAAAGCCCAGCCAAACCCTC
TCCCTGACCTGCGCTATCAGCGGCGATTCCGTGAGCAGCAACAGCGCCGCCTGGAAT
TGGATCCGTCAGAGCCCCAGCAGGGGCCTGGAGTGGCTGGGGCGGACCTATTACCG
GAGTAAGTGGTACAACGACTACGCCGTAAGCGTGAAGAGCCGCATCACCATTAATC
CTGACACCAGCAAGAACCAGTTCAGTCTGCAGCTGAACAGCGTGACTCCCGAGGAC
ACCGCCGTGTACTACTGCGCCCGCGAGGTGACTGGAGACCTGGAAGACGCCTTCGA -continued
CATCTGGGGCCAGGGCACAATGGTGACCGTCAGCAGCGGTGGCGGGGGCAGCGGCG
GAGGCGGATCCGGAGGCGGAGGGAGTGACATACAGATGACCCAGAGCCCTAGCAGC
CTCTCTGCCAGCGTGGGAGACCGGGTGACCATCACCTGCCGCGCCAGTCAGACCATC
TGGTCTTATCTGAACTGGTACCAGCAACGGCCCGGCAAGGCCCCTAACCTGTTGATC
TACGCCGCCAGCAGTCTCCAGAGCGGCGTTCCATCTCGCTTCAGCGGCCGCGGCAGC
GGCACAGACTTCACCCTGACCATCAGCAGCCTGCAGGCCGAGGACTTCGCCACCTAC
TACTGCCAGCAGAGCTACAGCATCCCCCAGACTTTOGGACAGGGCACCAAGTTGGA
GATCAAA (nucleotide sequence of CAR portion in PXL0662)
SEQ ID NO: 42
GCCGCCACCATGGCCCTGCCTGTGACAGCTCTGCTCCTCCCTCTGGCCCTGCTGCT
CCATGCCGCCAGACCCGAGACGTGAgAATTAATACGACTCACTATAGAGGGACTGGT
GAAATGCAGTTCAAGGTTTACACCTATAAAAGAGAGAGCCGCTATCGCCTGTTTGTG
GATGTACAGAGTGATATTATTGACACGCCCGGGCGACGGATGGTGATCCCCCTGGCC
AGTGCACGTCTGCTGTCAGATAAAGTCTCCCGTGAACTTTACCCGGTGGTGCATATC
GGGGATGAAAGCTGGCGCATGATGACCACCCAGATGGTCAGTGTGCCGGTCTCCGTC
ATCGGAGAAGAAGTGGCTGATCTCAGCCACCGCGAAAATGACATCAAAAACGCCAT
TAATCTGATGTTCTGGGGAATATAACGTCTCTTCGTGCCCGTGTTCCTGCCCGCCAAA
CCTACCACCACCCCTGCCCCTAGACCTCCCACCCCAGCCCCAACAATCGCCAGCCAG
CCTCTGTCTCTGCGGCCCGAAGCCTGTAGACCTGCTGCCGGCGGAGCCGTGCACACC
AGAGGCCTGGACTTCGCCTGCGACATCTACATCTGGGCCCCTCTGGCCGGCACCTGT
GGCGTGCTGCTGCTGAGCCTGGTGATCACCCTGTACTGCAACCACCGGAACAAACGG
GGCAGAAAGAAACTCCTGTATATATTCAAACAACCATTTATGAGACCAGTACAAACT
ACTCAAGAGGAAGATGGCTGTAGCTGCCGATTTCCAGAAGAAGAAGAAGGAGGATG
TGAACTGAGAGTGAAGTTCAGCAGATCCGCCGACGCCCCTGCCTACCAGCAGGGAC
AGAACCAGCTGTACAACGAGCTGAACCTGGGCAGACGGGAAGAGTACGACGTGCTG
GACAAGCGGAGAGGCCGGGACCCCGAGATGGGCGGAAAGCCCAGACGGAAGAACC
CCCAGGAAGGCCTGTATAACGAACTGCAGAAAGACAAGATGGCCGAGGCCTACAGC
GAGATCGGCATGAAGGGCGAGCGGAGGCGCGGCAAGGGCCACGATGGCCTGTACCA
GGGCCTGAGCACCGCCACCAAGGACACCTACGACGCCCTGCACATGCAGGCCCTGC
CCCCCAGAGGATCCGGAGAGGGAAGGGGCAGCTTATTAACATGTGGCGATGTGGAA
GAGAACCCCGGTCCCATGCTGCTGCTCGTGACCTCTTTACTGTTATGTGAGCTGCCCC
ACCCCGCTTTTTTACTGATCCCTCGTAAGGTGTGTAACGGAATCGGCATTGGCGAGTT
CAAGGACTCTTTAAGCATCAACGCCACAAACATCAAGCACTTCAAGAATTGTACCTC
CATCAGCGGCGATTTACACATTCTCCCCGTGGCTTTTCGTGGCGATTCCTTCACCCAC
ACCCCCCCTCTGGACCCCCAAGAGCTGGACATTTTAAAAACCGTGAAGGAGATCACC
GGCTTTCTGCTGATCCAAGCTTGGCCCGAGAATCGTACCGACCTCCACGCCTTCGAG
AATTTAGAGATTATTCGTGGAAGGACCAAGCAGCACGGCCAGTTCTCTTTAGCCGTC
GTGTCTTTAAACATTACCAGCCTCGGTTTAAGGTCTTTAAAGGAGATTAGCGACGGC
GACGTGATCATCTCCGGCAACAAGAACCTCTGCTACGCCAACACCATCAACTGGAA
GAAGCTGTTCGGAACCAGCGGCCAAAAGACCAAGATCATCAGCAATCGTGGAGAGA
ACTCTTGTAAGGCCACTGGTCAAGTTTGCCACGCCCTCTGTAGCCCCGAAGGATGTT
GGGGCCCCGAGCCTAGGGACTGTGTTAGCTGCAGAAACGTGAGCAGAGGCAGAGAG
TGTGTGGACAAATGCAATTTACTGGAAGGAGAGCCTAGGGAGTTCGTGGAGAACAG
CGAATGTATCCAGTGCCACCCCGAGTGTTTACCTCAAGCCATGAACATCACTTGTAC
CGGAAGGGGCCCCGATAACTGCATCCAATGCGCCCACTACATCGACGGACCCCACT
GCGTGAAAACTTGTCCCGCCGGAGTGATGGGAGAGAATAACACTTTAGTGTGGAAG
TACGCCGACGCTGGCCACGTCTGCCATCTGTGCCACCCCAACTGTACCTACGGCTGC
ACTGGTCCCGGTTTAGAGGGATGTCCTACCAACGGCCCCAAGATCCCCTCCATCGCC
ACCGGAATGGTGGGCGCTCTGTTATTACTGCTGGTGGTGGCTCTGGGCATCGGTTTA
TTCATGTGA (clone 17 CAR nucleotide sequence)
SEQ ID NO: 43
ATGGCCCTGCCTGTGACAGCTCTGCTCCTCCCTCTGGCCCTGCTGCTCCATGCCGC
CAGACCCGAGGTGCAGCTGTTGGAGTCTGGGGGAGGCTTGGTACAGCCTGGGGGGT
CCCTGAGACTCTCCTGTGCAGCCTCTGGATTCACCTTTAGCAGCTATGCCATGAGCTG
GGTCCGCCAGGCTCCAGGGAAGGGGCTGGAGTGGGTCTCAGCTATTAGTGGTAGTG
GTGGTAGCACATACTACGCAGACTCCGTGAAGGGCCGGTTCACCATCTCCAGAGACA
ATTCCAAGAACACGCTGTATCTGCAAATGAACAGCCTGAGAGCCGAGGACACGGCG
GTGTACTACTGCGCCAAGGTAGGAATATCCAGCTTACACGGAATGGACGTATGGGG
CCAGGGAACAACTGTCACCGTCAGCTCAGGTGGCGGGGGCAGCGGCGGAGGCGGAT
CCGGAGGCGGAGGGAGTGACATCCAGATGACCCAGTCTCCTTCCACCCTGTCTGCAT
CTGTAGGAGACAGAGTCACCATCACTTGCCGGGCCAGTCAGAGTATTAGTAGCTGGT
TGGCCTGGTATCAGCAGAAACCAGGGAAAGCCCCTAAGCTCCTGATCTATAAAGCCT
CCAGTTTGGAAAGTGGGGTCCCATCAAGGTTCAGCGGCAGTGGATCTGGGACAGAA
TTCACTCTCACCATCAGCAGCCTGCAGCCTGATGATTTTGCAACTTATTACTGCCAGC
AGTACGAACGCTTCCCTTGGACTTTTGGCGGAGGGACCAAGGTTGAGATCAAATTCG
TGCCCGTGTTCCTGCCCGCCAAACCTACTACTACCCCTGCACCTAGGCCTCCCACCCC
AGCCCCAACAATCGCCAGCCAGCCTCTGTCTCTGCGGCCCGAAGCCTGTAGACCTGC
TGCCGGCGGAGCCGTGCACACCAGAGGCCTGGACTTCGCCTGCGACATCTACATCTG
GGCCCCTCTGGCCGGCACCTGTGGCGTGCTGCTGCTGAGCCTGGTGATCACCCTGTA
CTGCAACCACCGGAACAAACGGGGCAGAAAGAAACTCCTGTATATATTCAAACAAC
CATTTATGAGACCAGTACAAACTACTCAAGAGGAAGATGGCTGTAGCTGCCGATTTC
CAGAAGAAGAAGAAGGAGGATGTGAACTGAGAGTGAAGTTCAGCAGATCCGCCGA
CGCCCCTGCCTACCAGCAGGGACAGAACCAGCTGTACAACGAGCTGAACCTGGGCA
GACGGGAAGAGTACGACGTGCTGGACAAGCGGAGAGGCCGGGACCCCGAGATGGG
CGGAAAGCCCAGACGGAAGAACCCCCAGGAAGGCCTGTATAACGAACTGCAGAAA
GACAAGATGGCCGAGGCCTACAGCGAGATCGGCATGAAGGGCGAGCGGAGGCGCG
GCAAGGGCCACGATGGCCTGTACCAGGGCCTGAGCACCGCCACCAAGGACACCTAC -continued
```
GACGCCCTGCACATGCAGGCCCTGCCCCCAGAGGATCCGGAGAGGGAAGGGGCAG
CTTATTAACATGTGGCGATGTGGAAGAGAACCCCGGTCCCATGCTGCTGCTCGTGAC
CTCTTTACTGTTATGTGAGCTGCCCCACCCCGCTTTTTTACTGATCCCTCGTAAGGTG
TGTAACGGAATCGGCATTGGCGAGTTCAAGGACTCTTTAAGCATCAACGCCACAAAC
ATCAAGCACTTCAAGAATTGTACCTCCATCAGCGGCGATTTACACATTCTCCCCGTG
GCTTTTCGTGGCGATTCCTTCACCCACACCCCCCCTCTGGACCCCCAAGAGCTGGAC
ATTTTAAAAACCGTGAAGGAGATCACCGGCTTTCTGCTGATCCAAGCTTGGCCCGAG
AATCGTACCGACCTCCACGCCTTCGAGAATTTAGAGATTATTCGTGGAAGGACCAAG
CAGCACGGCCAGTTCTCTTTAGCCGTCGTGTCTTTAAACATTACCAGCCTCGGTTTAA
GGTCTTTAAAGGAGATTAGCGACGGCGACGTGATCATCTCCGGCAACAAGAACCTCT
GCTACGCCAACACCATCAACTGGAAGAAGCTGTTCGGAACCAGCGGCCAAAAGACC
AAGATCATCAGCAATCGTGGAGAGAACTCTTGTAAGGCCACTGGTCAAGTTTGCCAC
GCCCTCTGTAGCCCCGAAGGATGTTGGGGCCCCGAGCCTAGGGACTGTGTTAGCTGC
AGAAACGTGAGCAGAGGCAGAGAGTGTGTGGACAAATGCAATTTACTGGAAGGAGA
GCCTAGGGAGTTCGTGGAGAACAGCGAATGTATCCAGTGCCACCCCGAGTGTTTACC
TCAAGCCATGAACATCACTTGTACCGGAAGGGGCCCCGATAACTGCATCCAATGCGC
CCACTACATCGACGGACCCCACTGCGTGAAAACTTGTCCCGCCGGAGTGATGGGAG
AGAATAACACTTTAGTGTGGAAGTACGCCGACGCTGGCCACGTCTGCCATCTGTGCC
ACCCCAACTGTACCTACGGCTGCACTGGTCCCGGTTTAGAGGGATGTCCTACCAACG
GCCCCAAGATCCCCTCCATCGCCACCGGAATGGTGGGCGCTCTGTTATTACTGCTGG
TGGTGGCTCTGGGCATCGGTTTATTCATGTGA (clone 28 CAR nucleotide sequence)
                                                SEQ ID NO: 44
ATGGCCCTGCCTGTGACAGCTCTGCTCCTCCCTCTGGCCCTGCTGCTCCATGCCGC
CAGACCCCAGGTGCAGCTGCAGGAGTCGGGCCCAGGACTGGTGAAGCCTTCGGAGA
CCCTGTCCCTCACCTGCACTGTCTCTGGTGGCTCCATCAGTAGTTACTACTGGAGCTG
GATCCGGCAGCCCGCCGGGAAGGGACTGGAGTGGATTGGGCGTATCTATACCAGTG
GGAGCACCAACTACAACCCCTCCCTCAAGAGTCGAGTCACCATGTCAGTAGACACGT
CCAAGAACCAGTTCTCCCTGAAGCTGAGCTCTGTGACCGCCGCGGACACGGCGGTGT
ACTACTGCGCCAGAGACTTGTACAGAGATGGAATGGACGTATGGGGCCAGGGAACA
ACTGTCACCGTCAGCTCAGGTGGCGGGGGCAGCGGCGGAGGCGGATCCGGAGGCGG
AGGGAGTGACATCCAGATGACCCAGTCTCCTTCCACCCTGTCTGCATCTGTAGGAGA
CAGAGTCACCATCACTTGCCGGGCCAGTCAGAGTATTAGTAGCTGGTTGGCCTGGTA
TCAGCAGAAACCAGGGAAAGCCCCTAAGCTCCTGATCTCCGATGCCTCCAGTTTGGA
AAGTGGGGTCCCATCAAGGTTCAGCGGCAGTGGATCTGGGACAGAATTCACTCTCAC
CATCAGCAGCCTGCAGCCTGATGATTTTGCAACTTATTACTGCCAGCAGGCCAATAC
CTACTCTCCTACTTTTGGCGGAGGGACCAAGGTTGAGATCAAATTCGTGCCCGTGTT
CCTGCCCGCCAAACCCACTACTACACCAGCACCCAGACCTCCCACCCCAGCCCCAAC
AATCGCCAGCCAGCCTCTGTCTCTGCGGCCCGAAGCCTGTAGACCTGCTGCCGGCGG
AGCCGTGCACACCAGAGGCCTGGACTTCGCCTGCGACATCTACATCTGGGCCCCTCT
GGCCGGCACCTGTGGCGTGCTGCTGCTGAGCCTGGTGATCACCCTGTACTGCAACCA
CCGGAACAAACGGGGCAGAAAGAAACTCCTGTATATATTCAAACAACCATTTATGA
GACCAGTACAAACTACTCAAGAGGAAGATGGCTGTAGCTGCCGATTTCCAGAAGAA
GAAGAAGGAGGATGTGAACTGAGAGTGAAGTTCAGCAGATCCGCCGACGCCCCTGC
CTACCAGCAGGGACAGAACCAGCTGTACAACGAGCTGAACCTGGGCAGACGGGAAG
AGTACGACGTGCTGGACAAGCGGAGAGGCCGGGACCCCGAGATGGGCGGAAAGCC
CAGACGGAAGAACCCCCAGGAAGGCCTGTATAACGAACTGCAGAAAGACAAGATG
GCCGAGGCCTACAGCGAGATCGGCATGAAGGGCGAGCGGAGGCGCGGCAAGGGCC
ACGATGGCCTGTACCAGGGCCTGAGCACCGCCACCAAGGACACCTACGACGCCCTG
CACATGCAGGCCCTGCCCCCCAGAGGATCCGGAGAGGGAAGGGGCAGCTTATTAAC
ATGTGGCGATGTGGAAGAGAACCCCGGTCCCATGCTGCTGCTCGTGACCTCTTTACT
GTTATGTGAGCTGCCCCACCCCGCTTTTTTACTGATCCCTCGTAAGGTGTGTAACGGA
ATCGGCATTGGCGAGTTCAAGGACTCTTTAAGCATCAACGCCACAAACATCAAGCAC
TTCAAGAATTGTACCTCCATCAGCGGCGATTTACACATTCTCCCCGTGGCTTTTCGTG
GCGATTCCTTCACCCACACCCCCCCTCTGGACCCCCAAGAGCTGGACATTTTAAAAA
CCGTGAAGGAGATCACCGGCTTTCTGCTGATCCAAGCTTGGCCCGAGAATCGTACCG
ACCTCCACGCCTTCGAGAATTTAGAGATTATTCGTGGAAGGACCAAGCAGCACGGCC
AGTTCTCTTTAGCCGTCGTGTCTTTAAACATTACCAGCCTCGGTTTAAGGTCTTTAAA
GGAGATTAGCGACGGCGACGTGATCATCTCCGGCAACAAGAACCTCTGCTACGCCA
ACACCATCAACTGGAAGAAGCTGTTCGGAACCAGCGGCCAAAAGACCAAGATCATC
AGCAATCGTGGAGAGAACTCTTGTAAGGCCACTGGTCAAGTTTGCCACGCCCTCTGT
AGCCCCGAAGGATGTTGGGGCCCCGAGCCTAGGGACTGTGTTAGCTGCAGAAACGT
GAGCAGAGGCAGAGAGTGTGTGGACAAATGCAATTTACTGGAAGGAGAGCCTAGGG
AGTTCGTGGAGAACAGCGAATGTATCCAGTGCCACCCCGAGTGTTTACCTCAAGCCA
TGAACATCACTTGTACCGGAAGGGGCCCCGATAACTGCATCCAATGCGCCCACTACA
TCGACGGACCCCACTGCGTGAAAACTTGTCCCGCCGGAGTGATGGGAGAGAATAAC
ACTTTAGTGTGGAAGTACGCCGACGCTGGCCACGTCTGCCATCTGTGCCACCCCAAC
TGTACCTACGGCTGCACTGGTCCCGGTTTAGAGGGATGTCCTACCAACGGCCCCAAG
ATCCCCTCCATCGCCACCGGAATGGTGGGCGCTCTGTTATTACTGCTGGTGGTGGCTC
TGGGCATCGGTTTATTCATGTGA (clone 80 CAR nucleotide sequence)
                                                SEQ ID NO: 45
ATGGCCCTGCCTGTGACAGCTCTGCTCCTCCCTCTGGCCCTGCTGCTCCATGCCGC
CAGACCCCAGGTGCAGCTGCAGGAGTCGGGCCCAGGACTGGTGAAGCCTTCGGGGA
CCCTGTCCCTCACCTGCGCTGTCTCTGGTGGCTCCATCAGCAGTAGTAACTGGTGGA
GTTGGGTCCGCCAGCCCCCAGGGAAGGGGCTGGAGTGGATTGGGGAAATCTATCAT
AGTGGGAGCACCAACTACAACCCGTCCCTCAAGAGTCGAGTCACCATATCAGTAGA
CAAGTCCAAGAACCAGTTCTCCCTGAAGCTGAGCTCTGTGACCGCCGCGGACACGGC
GGTGTACTACTGCGCCAGACTTCCTGGATACGAGTCAGCTTTCGACATATGGGGTCA
```

```
-continued
GGGTACAATGGTCACCGTCAGCTCAGGTGGCGGGGGCAGCGGCGGAGGCGGATCCG
GAGGCGGAGGGAGTGAAATTGTGTTGACGCAGTCTCCAGGCACCCTGTCTTTGTCTC
CAGGGGAAAGAGCCACCCTCTCCTGCAGGGCCAGTCAGAGTGTTAGCAGCAGCTAC
TTAGCCTGGTACCAGCAGAAACCTGGCCAGGCTCCCAGGCTCCTCATCTATGGTGCA
TCCAGCAGGGCCACTGGCATCCCAGACAGGTTCAGTGGCAGTGGGTCTGGGACAGA
CTTCACTCTCACCATCAGCAGACTGGAGCCTGAAGATTTTGCAGTGTATTACTGTCA
GCAGGCCGGACTCTTCCCTTACACTTTTGGCGGAGGGACCAAGGTTGAGATCAAATT
CGTGCCCGTGTTCCTGCCCGCCAAACCAACTACTACTCCTGCCCCAAGGCCACCCAC
CCCAGCCCCAACAATCGCCAGCCAGCCTCTGTCTCTGCGGCCCGAAGCCTGTAGACC
TGCTGCCGGCGGAGCCGTGCACACCAGAGGCCTGGACTTCGCCTGCGACATCTACAT
CTGGGCCCCTCTGGCCGGCACCTGTGGCGTGCTGCTGCTGAGCCTGGTGATCACCCT
GTACTGCAACCACCGGAACAAACGGGGCAGAAAGAAACTCCTGTATATATTCAAAC
AACCATTTATGAGACCAGTACAAACTACTCAAGAGGAAGATGGCTGTAGCTGCCGA
TTTCCAGAAGAAGAAGAAGGAGGATGTGAACTGAGAGTGAAGTTCAGCAGATCCGC
CGACGCCCCTGCCTACCAGCAGGGACAGAACCAGCTGTACAACGAGCTGAACCTGG
GCAGACGGGAAGAGTACGACGTGCTGGACAAGCGGAGAGGCCGGGACCCCGAGAT
GGGCGGAAAGCCCAGACGGAAGAACCCCCAGGAAGGCCTGTATAACGAACTGCAG
AAAGACAAGATGGCCGAGGCCTACAGCGAGATCGGCATGAAGGGCGAGCGGAGGC
GCGGCAAGGGCCACGATGGCCTGTACCAGGGCCTGAGCACCGCCACCAAGGACACC
TACGACGCCCTGCACATGCAGGCCCTGCCCCCCAGAGGATCCGGAGAGGGAAGGGG
CAGCTTATTAACATGTGGCGATGTGGAAGAGAACCCCGGTCCCATGCTGCTGCTCGT
GACCTCTTTACTGTTATGTGAGCTGCCCCACCCCGCTTTTTTACTGATCCCTCGTAAG
GTGTGTAACGGAATCGGCATTGGCGAGTTCAAGGACTCTTTAAGCATCAACGCCACA
AACATCAAGCACTTCAAGAATTGTACCTCCATCAGCGGCGATTTACACATTCTCCCC
GTGGCTTTTCGTGGCGATTCCTTCACCCACACCCCCCCTCTGGACCCCCAAGAGCTG
GACATTTTAAAAACCGTGAAGGAGATCACCGGCTTTCTGCTGATCCAAGCTTGGCCC
GAGAATCGTACCGACCTCCACGCCTTCGAGAATTTAGAGATTATTCGTGGAAGGACC
AAGCAGCACGGCCAGTTCTCTTTAGCCGTCGTGTCTTTAAACATTACCAGCCTCGGTT
TAAGGTCTTTAAAGGAGATTAGCGACGGCGACGTGATCATCTCCGGCAACAAGAAC
CTCTGCTACGCCAACACCATCAACTGGAAGAAGCTGTTCGGAACCAGCGGCCAAAA
GACCAAGATCATCAGCAATCGTGGAGAGAACTCTTGTAAGGCCACTGGTCAAGTTTG
CCACGCCCTCTGTAGCCCCGAAGGATGTTGGGGCCCCGAGCCTAGGGACTGTGTTAG
CTGCAGAAACGTGAGCAGAGGCAGAGAGTGTGTGGACAAATGCAATTTACTGGAAG
GAGAGCCTAGGGAGTTCGTGGAGAACAGCGAATGTATCCAGTGCCACCCCGAGTGT
TTACCTCAAGCCATGAACATCACTTGTACCGGAAGGGGCCCCGATAACTGCATCCAA
TGCGCCCACTACATCGACGGACCCCACTGCGTGAAAACTTGTCCCGCCGGAGTGATG
GGAGAGAATAACACTTTAGTGTGGAAGTACGCCGACGCTGGCCACGTCTGCCATCTG
TGCCACCCCAACTGTACCTACGGCTGCACTGGTCCCGGTTTAGAGGGATGTCCTACC
AACGGCCCCAAGATCCCCTCCATCGCCACCGGAATGGTGGGCGCTCTGTTATTACTG
CTGGTGGTGGCTCTGGGCATCGGTTATTCATGTGA
```

REFERENCES

1. Shah, N. N., et al., Characterization of CD22 expression in acute lymphoblastic leukemia *Pediatr Blood Cancer,* 2015. 62(6): p. 964-9.
2. Fry, T. J., et al., CD22-targeted CAR T cells induce remission in B-ALL that is naive or resistant to CD19-targeted CAR immunotherapy. *Nat Med,* 2018. 24(1): p. 20-28.
3. Xiao, X., et al., Identification and characterization of fully human anti-CD22 monoclonal antibodies. *MAbs,* 2009. 1(3): p. 297-303.
4. Haso, W, et al., Anti-CD22-chimeric antigen receptors targeting B-cell precursor acute lymphoblastic leukemia. *Blood,* 2013. 121(7): p. 1165-74.
5. Rydzek, J., et al., Chimeric Antigen Receptor Library Screening Using a Novel NF-kappaB/NFAT Reporter Cell Platform. *Mol Ther,* 2019. 27(2): p. 287-299.
6. Alter, G., J. M. Malenfant, and M. Altfeld, CD107a as a functional marker for the identification of natural killer cell activity. *J Immunol Methods,* 2004. 294(1-2): p. 15-22.
7. Matta, H., et al., Development and characterization of a novel luciferase based cytotoxicity assay. Sci Rep, 2018. 8(1): p. 199.
8. MAJZNER R. G. AND C. L. MACKALL, TUMOR ANTIGEN ESCAPE FROM CAR T-CELL THERAPY. *CANCER DISCOV,* 2018. 8(10): P. 1219-1226.

The invention claimed is:

1. An anti-CD22 antibody molecule comprising a light chain variable region and a heavy chain variable region, wherein the light chain variable region and the heavy chain variable region comprises complementarity-determining regions selected from any of the following groups: wherein the light chain variable region comprises LCDR1 having the sequence set forth in SEQ ID NO: 13, LCDR2 having the sequence set forth in SEQ ID NO: 14, and LCDR3 having the sequence set forth in SEQ ID NO: 15, and the heavy chain variable region comprises HCDR1 having the sequence set forth in SEQ ID NO: 16, HCDR2 having the sequence set forth in SEQ ID NO: 17, and HCDR3 having the sequence set forth in SEQ ID NO: 18:

the light chain variable region comprises LCDR1 having the sequence set forth in SEQ ID NO: 1, LCDR2 having the sequence set forth in SEQ ID NO: 2, and LCDR3 having the sequence set forth in SEQ ID NO: 3, and the heavy chain variable region comprises HCDR1 having the sequence set forth in SEQ ID NO: 4, HCDR2 having the sequence set forth in SEQ ID NO: 5, and HCDR3 having the sequence set forth in SEQ ID NO: 6; or the light chain variable region comprises LCDR1 having the sequence set forth in SEQ ID NO: 7, LCDR2 having the sequence set forth in SEQ ID NO: 8, and LCDR3 having the sequence set forth in SEQ ID NO: 9, and the heavy chain variable region comprises HCDR1 having the sequence set forth in SEQ ID NO: 10, HCDR2 having the sequence set forth in SEQ ID NO: 11, and HCDR3 having the sequence set forth in SEQ ID NO: 12.

2. The anti-CD22 antibody molecule of claim 1, wherein the light chain variable region comprises an amino acid sequence having at least 90% sequence identity with the sequence set forth in SEQ ID NO: 23, and the heavy chain variable region comprises an amino acid sequence having at least 90% sequence identity with the sequence set forth in SEQ ID NO:24; the light chain variable region comprises an amino acid sequence having at least 90% sequence identity with the sequence set forth in SEQ ID NO: 19, and the heavy chain variable region comprises an amino acid sequence having at least 90% sequence identity with the sequence set forth in SEQ ID NO: 20; or the light chain variable region comprises an amino acid sequence having at least 90% sequence identity with the sequence set forth in SEQ ID NO: 21, and the heavy chain variable region comprises an amino acid sequence having at least 90% sequence identity with the sequence set forth in SEQ ID NO: 22.

3. The anti-CD22 antibody molecule of claim 1, wherein the anti-CD22 antibody molecule is in the form of a scFv and comprises an amino acid sequence having at least 90% sequence identity with the sequence set forth in SEO ID NO: 27, SEQ ID NO: 25 or SEQ ID NO: 26.

4. The anti-CD22 antibody molecule of claim 1, wherein the anti-CD22 antibody molecule is in the form of IgG with a $K_D$ value of no greater than 2 nM for binding to CD22; or the anti-CD22 antibody molecule is in the form of Fab with a $K_D$ value of no greater than 20 nM for binding to CD22.

5. The anti-CD22 antibody molecule of any one of claim 1, wherein the anti-CD22 antibody molecule is a fully human antibody molecule.

6. A CD22-targeted chimeric antigen receptor comprising an antigen-binding domain binding to CD22, the antigen-binding domain comprising a light chain variable region and a heavy chain variable region, wherein the light chain variable region and the heavy chain variable region comprises complementarity-determining regions selected from any of the following groups: wherein the light chain variable region comprises LCDR1 having the sequence set forth in SEQ ID NO: 13, LCDR2 having the sequence set forth in SEQ ID NO: 14, and LCDR3 having the sequence set forth in SEQ ID NO: 15, and the heavy chain variable region comprises HCDR1 having the sequence set forth in SEQ ID NO: 16, HCDR2 having the sequence set forth in SEQ ID NO: 17, and HCDR3 having the sequence set forth in SEQ ID NO: 18;

the light chain variable region comprises LCDR1 having the sequence set forth in SEQ ID NO: 1, LCDR2 having the sequence set forth in SEQ ID NO: 2, and LCDR3 having the sequence set forth in SEQ ID NO: 3, and the heavy chain variable region comprises HCDR1 having the sequence set forth in SEQ ID NO: 4, HCDR2 having the sequence set forth in SEQ ID NO: 5, and HCDR3 having the sequence set forth in SEQ ID NO: 6; or the light chain variable region comprises LCDR1 having the sequence set forth in SEQ ID NO: 7, LCDR2 having the sequence set forth in SEQ ID NO: 8, and LCDR3 having the sequence set forth in SEQ ID NO:

9, and the heavy chain variable region comprises HCDR1 having the sequence set forth in SEQ ID NO: 10, HCDR2 having the sequence set forth in SEQ ID NO: 11, and HCDR3 having the sequence set forth in SEQ ID NO: 12.

7. The chimeric antigen receptor of claim 6, wherein the light chain variable region comprises an amino acid sequence having at least 90% sequence identity with the sequence set forth in SEQ ID NO: 23, and the heavy chain variable region comprises an amino acid sequence having at least 90% sequence identity with the sequence set forth in SEQ ID NO:24; the light chain variable region comprises an amino acid sequence having at least 90% sequence identity with the sequence set forth in SEQ ID NO: 19, and the heavy chain variable region comprises an amino acid sequence having at least 90% sequence identity with the sequence set forth in SEQ ID NO: 20; or the light chain variable region comprises an amino acid sequence having at least 90% sequence identity with the sequence set forth in SEQ ID NO: 21, and the heavy chain variable region comprises an amino acid sequence having at least 90% sequence identity with the sequence set forth in SEQ ID NO: 22.

8. The chimeric antigen receptor of claim 6, wherein the antigen-binding domain is in the form of a scFv.

9. The chimeric antigen receptor of claim 6, wherein the antigen-binding domain comprises an amino acid sequence having at least 90% sequence identity with the sequence set forth in SEQ ID NO: 27, SEQ ID NO: 25 or SEQ ID NO: 26.

10. The chimeric antigen receptor of claim 6, further comprising a CD3z intracellular signaling domain and a 4-1BB costimulatory signaling domain.

11. The chimeric antigen receptor of claim 6, wherein the chimeric antigen receptor comprises, sequentially from N-terminus to C-terminus, a CD8α signal peptide, the antigen-binding domain, a CD8α hinge region, a transmembrane region, a 4-1BB costimulatory signaling domain, and a CD3z intracellular signaling domain.

12. The chimeric antigen receptor of claim 6, comprising an amino acid sequence having at least 90% sequence identity with the sequence set forth in SEQ ID NO: 37, SEQ ID NO: 35 or SEQ ID NO: 36.

13. The chimeric antigen receptor of claim 6, further comprising self-cleaving polypeptide T2A and tEGFR sequence at the C-terminus.

14. A nucleic acid molecule encoding the chimeric antigen receptor of claim 6.

15. An immune cell expressing the chimeric antigen receptor of claim 6, wherein the immune cell is a T cell or a NK cell.

16. A pharmaceutical composition comprising the immune cell of claim 15, and a pharmaceutically acceptable carrier.

17. A method of treating B-cell leukemia or B-cell lymphoma in a patient, comprising administering to the patient a therapeutically effective amount of the pharmaceutical composition of claim 16.

* * * * *

SEQUENCE LISTING

```
<160> NUMBER OF SEQ ID NOS: 45

<210> SEQ ID NO 1
<211> LENGTH: 11
<212> TYPE: PRT
<213> ORGANISM: Artificial
<220> FEATURE:
<223> OTHER INFORMATION: Clone 17 LCDR1 amino acid sequence

<400> SEQUENCE: 1

Arg Ala Ser Gln Ser Ile Ser Ser Trp Leu Ala
1               5                   10

<210> SEQ ID NO 2
```

```
<211> LENGTH: 7
<212> TYPE: PRT
<213> ORGANISM: Artificial
<220> FEATURE:
<223> OTHER INFORMATION: Clone 17 LCDR2 amino acid sequence

<400> SEQUENCE: 2

Lys Ala Ser Ser Leu Glu Ser
1               5

<210> SEQ ID NO 3
<211> LENGTH: 9
<212> TYPE: PRT
<213> ORGANISM: Artificial
<220> FEATURE:
<223> OTHER INFORMATION: Clone 17 LCDR3 amino acid sequence

<400> SEQUENCE: 3

Gln Gln Tyr Glu Arg Phe Pro Trp Thr
1               5

<210> SEQ ID NO 4
<211> LENGTH: 9
<212> TYPE: PRT
<213> ORGANISM: Artificial
<220> FEATURE:
<223> OTHER INFORMATION: Clone 17 HCDR1 amino acid sequence

<400> SEQUENCE: 4

Phe Thr Phe Ser Ser Tyr Ala Met Ser
1               5

<210> SEQ ID NO 5
<211> LENGTH: 17
<212> TYPE: PRT
<213> ORGANISM: Artificial
<220> FEATURE:
<223> OTHER INFORMATION: Clone 17 HCDR2 amino acid sequence

<400> SEQUENCE: 5

Ala Ile Ser Gly Ser Gly Gly Ser Thr Tyr Tyr Ala Asp Ser Val Lys
1               5                   10                  15

Gly

<210> SEQ ID NO 6
<211> LENGTH: 13
<212> TYPE: PRT
<213> ORGANISM: Artificial
<220> FEATURE:
<223> OTHER INFORMATION: Clone 17 HCDR3 amino acid sequence

<400> SEQUENCE: 6

Ala Lys Val Gly Ile Ser Ser Leu His Gly Met Asp Val
1               5                   10

<210> SEQ ID NO 7
<211> LENGTH: 11
<212> TYPE: PRT
<213> ORGANISM: Artificial
<220> FEATURE:
<223> OTHER INFORMATION: Clone 28 LCDR1 amino acid sequence

<400> SEQUENCE: 7

Arg Ala Ser Gln Ser Ile Ser Ser Trp Leu Ala
1               5                   10
```

```
<210> SEQ ID NO 8
<211> LENGTH: 7
<212> TYPE: PRT
<213> ORGANISM: Artificial
<220> FEATURE:
<223> OTHER INFORMATION: Clone 28 LCDR2 amino acid sequence

<400> SEQUENCE: 8

Asp Ala Ser Ser Leu Glu Ser
1               5

<210> SEQ ID NO 9
<211> LENGTH: 9
<212> TYPE: PRT
<213> ORGANISM: Artificial
<220> FEATURE:
<223> OTHER INFORMATION: Clone  28 LCDR3 amino acid sequence

<400> SEQUENCE: 9

Gln Gln Ala Asn Thr Tyr Ser Pro Thr
1               5

<210> SEQ ID NO 10
<211> LENGTH: 9
<212> TYPE: PRT
<213> ORGANISM: Artificial
<220> FEATURE:
<223> OTHER INFORMATION: Clone 28 HCDR1 amino acid sequence

<400> SEQUENCE: 10

Gly Ser Ile Ser Ser Tyr Tyr Trp Ser
1               5

<210> SEQ ID NO 11
<211> LENGTH: 16
<212> TYPE: PRT
<213> ORGANISM: Artificial
<220> FEATURE:
<223> OTHER INFORMATION: Clone 28 HCDR2 amino acid sequence

<400> SEQUENCE: 11

Arg Ile Tyr Thr Ser Gly Ser Thr Asn Tyr Asn Pro Ser Leu Lys Ser
1               5                   10                  15

<210> SEQ ID NO 12
<211> LENGTH: 11
<212> TYPE: PRT
<213> ORGANISM: Artificial
<220> FEATURE:
<223> OTHER INFORMATION: Clone 28 HCDR3 amino acid sequence

<400> SEQUENCE: 12

Ala Arg Asp Leu Tyr Arg Asp Gly Met Asp Val
1               5                   10

<210> SEQ ID NO 13
<211> LENGTH: 12
<212> TYPE: PRT
<213> ORGANISM: Artificial
<220> FEATURE:
<223> OTHER INFORMATION: Clone 80 LCDR1 amino acid sequence

<400> SEQUENCE: 13

Arg Ala Ser Gln Ser Val Ser Ser Ser Tyr Leu Ala
1               5                   10

<210> SEQ ID NO 14
```

```
<211> LENGTH: 7
<212> TYPE: PRT
<213> ORGANISM: Artificial
<220> FEATURE:
<223> OTHER INFORMATION: Clone 80 LCDR2 amino acid sequence

<400> SEQUENCE: 14

Gly Ala Ser Ser Arg Ala Thr
1               5

<210> SEQ ID NO 15
<211> LENGTH: 9
<212> TYPE: PRT
<213> ORGANISM: Artificial
<220> FEATURE:
<223> OTHER INFORMATION: Clone 80 LCDR3 amino acid sequence

<400> SEQUENCE: 15

Gln Gln Ala Gly Leu Phe Pro Tyr Thr
1               5

<210> SEQ ID NO 16
<211> LENGTH: 10
<212> TYPE: PRT
<213> ORGANISM: Artificial
<220> FEATURE:
<223> OTHER INFORMATION: Clone 80 HCDR1 amino acid sequence

<400> SEQUENCE: 16

Gly Ser Ile Ser Ser Ser Asn Trp Trp Ser
1               5                   10

<210> SEQ ID NO 17
<211> LENGTH: 16
<212> TYPE: PRT
<213> ORGANISM: Artificial
<220> FEATURE:
<223> OTHER INFORMATION: Clone 80 HCDR2 amino acid sequence

<400> SEQUENCE: 17

Glu Ile Tyr His Ser Gly Ser Thr Asn Tyr Asn Pro Ser Leu Lys Ser
1               5                   10                  15

<210> SEQ ID NO 18
<211> LENGTH: 12
<212> TYPE: PRT
<213> ORGANISM: Artificial
<220> FEATURE:
<223> OTHER INFORMATION: Clone 80 HCDR3 amino acid sequence

<400> SEQUENCE: 18

Ala Arg Leu Pro Gly Tyr Glu Ser Ala Phe Asp Ile
1               5                   10

<210> SEQ ID NO 19
<211> LENGTH: 107
<212> TYPE: PRT
<213> ORGANISM: Artificial
<220> FEATURE:
<223> OTHER INFORMATION: Clone 17 VL amino acid sequence

<400> SEQUENCE: 19

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Ser Ile Ser Ser Trp
            20                  25                  30
```

```
Leu Ala Trp Tyr Gln Gln Lys Pro Gly Lys Ala Pro Lys Leu Leu Ile
        35                  40                  45

Tyr Lys Ala Ser Ser Leu Glu Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Asp Asp Phe Ala Thr Tyr Tyr Cys Gln Gln Tyr Glu Arg Phe Pro Trp
                 85                  90                  95

Thr Phe Gly Gly Gly Thr Lys Val Glu Ile Lys
                100                 105
```

<210> SEQ ID NO 20
<211> LENGTH: 120
<212> TYPE: PRT
<213> ORGANISM: Artificial
<220> FEATURE:
<223> OTHER INFORMATION: Clone 17 VH amino acid sequence

<400> SEQUENCE: 20

```
Glu Val Gln Leu Leu Glu Ser Gly Gly Gly Leu Val Gln Pro Gly Gly
 1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Lys Val Gly Ile Ser Ser Leu His Gly Met Asp Val Trp Gly Gln
                100                 105                 110

Gly Thr Thr Val Thr Val Ser Ser
            115                 120
```

<210> SEQ ID NO 21
<211> LENGTH: 107
<212> TYPE: PRT
<213> ORGANISM: Artificial
<220> FEATURE:
<223> OTHER INFORMATION: Clone 28 VL amino acid sequence

<400> SEQUENCE: 21

```
Asp Ile Gln Met Thr Gln Ser Pro Ser Thr Leu Ser Ala Ser Val Gly
 1               5                   10                  15

Asp Arg Val Thr Ile Thr Cys Arg Ala Ser Gln Ser Ile Ser Ser Trp
            20                  25                  30

Leu Ala Trp Tyr Gln Gln Lys Pro Gly Lys Ala Pro Lys Leu Leu Ile
        35                  40                  45

Ser Asp Ala Ser Ser Leu Glu Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Asp Asp Phe Ala Thr Tyr Tyr Cys Gln Gln Ala Asn Thr Tyr Ser Pro
                 85                  90                  95

Thr Phe Gly Gly Gly Thr Lys Val Glu Ile Lys
                100                 105
```

<210> SEQ ID NO 22
<211> LENGTH: 117
<212> TYPE: PRT
<213> ORGANISM: Artificial
<220> FEATURE:
<223> OTHER INFORMATION: Clone 28 VH amino acid sequence

<400> SEQUENCE: 22

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser Ser Tyr
            20                  25                  30

Tyr Trp Ser Trp Ile Arg Gln Pro Ala Gly Lys Gly Leu Glu Trp Ile
        35                  40                  45

Gly Arg Ile Tyr Thr Ser Gly Ser Thr Asn Tyr Asn Pro Ser Leu Lys
    50                  55                  60

Ser Arg Val Thr Met Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Leu Tyr Arg Asp Gly Met Asp Val Trp Gly Gln Gly Thr Thr
            100                 105                 110

Val Thr Val Ser Ser
        115

<210> SEQ ID NO 23
<211> LENGTH: 108
<212> TYPE: PRT
<213> ORGANISM: Artificial
<220> FEATURE:
<223> OTHER INFORMATION: Clone 80 VL amino acid sequence

<400> SEQUENCE: 23

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Ala Gly Leu Phe Pro
                85                  90                  95

Tyr Thr Phe Gly Gly Gly Thr Lys Val Glu Ile Lys
            100                 105

<210> SEQ ID NO 24
<211> LENGTH: 119
<212> TYPE: PRT
<213> ORGANISM: Artificial
<220> FEATURE:
<223> OTHER INFORMATION: Clone 80 VH amino acid sequence

<400> SEQUENCE: 24

Gln Val Gln Leu Gln Glu Ser Gly Pro Gly Leu Val Lys Pro Ser Gly
1               5                   10                  15

Thr Leu Ser Leu Thr Cys Ala Val Ser Gly Gly Ser Ile Ser Ser Ser
            20                  25                  30

Asn Trp Trp Ser Trp Val Arg Gln Pro Pro Gly Lys Gly Leu Glu Trp
        35                  40                  45

Ile Gly Glu Ile Tyr His Ser Gly Ser Thr Asn Tyr Asn Pro Ser Leu
    50                  55                  60

Lys Ser Arg Val Thr Ile Ser Val Asp Lys Ser Lys Asn Gln Phe Ser
65                  70                  75                  80

Leu Lys Leu Ser Ser Val Thr Ala Ala Asp Thr Ala Val Tyr Tyr Cys
                85                  90                  95

Ala Arg Leu Pro Gly Tyr Glu Ser Ala Phe Asp Ile Trp Gly Gln Gly
            100                 105                 110

Thr Met Val Thr Val Ser Ser
            115

<210> SEQ ID NO 25
<211> LENGTH: 242
<212> TYPE: PRT
<213> ORGANISM: Artificial
<220> FEATURE:
<223> OTHER INFORMATION: Clone 17 scFv amino acid sequence

<400> SEQUENCE: 25

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Val Gly Ile Ser Ser Leu His Gly Met Asp Val Trp Gly Gln
            100                 105                 110

Gly Thr Thr Val Thr Val Ser Ser Gly Gly Gly Gly Ser Gly Gly Gly
            115                 120                 125

Gly Ser Gly Gly Gly Gly Ser Asp Ile Gln Met Thr Gln Ser Pro Ser
        130                 135                 140

Thr Leu Ser Ala Ser Val Gly Asp Arg Val Thr Ile Thr Cys Arg Ala
145                 150                 155                 160

Ser Gln Ser Ile Ser Ser Trp Leu Ala Trp Tyr Gln Gln Lys Pro Gly
                165                 170                 175

Lys Ala Pro Lys Leu Leu Ile Tyr Lys Ala Ser Ser Leu Glu Ser Gly
            180                 185                 190

Val Pro Ser Arg Phe Ser Gly Ser Gly Ser Gly Thr Glu Phe Thr Leu
        195                 200                 205

Thr Ile Ser Ser Leu Gln Pro Asp Asp Phe Ala Thr Tyr Tyr Cys Gln
    210                 215                 220

Gln Tyr Glu Arg Phe Pro Trp Thr Phe Gly Gly Gly Thr Lys Val Glu
225                 230                 235                 240

Ile Lys

-continued

```
<210> SEQ ID NO 26
<211> LENGTH: 239
<212> TYPE: PRT
<213> ORGANISM: Artificial
<220> FEATURE:
<223> OTHER INFORMATION: Clone 28 scFv amino acid sequence

<400> SEQUENCE: 26

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser Ser Tyr
            20                  25                  30

Tyr Trp Ser Trp Ile Arg Gln Pro Ala Gly Lys Gly Leu Glu Trp Ile
        35                  40                  45

Gly Arg Ile Tyr Thr Ser Gly Ser Thr Asn Tyr Asn Pro Ser Leu Lys
    50                  55                  60

Ser Arg Val Thr Met Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Leu Tyr Arg Asp Gly Met Asp Val Trp Gly Gln Gly Thr Thr
            100                 105                 110

Val Thr Val Ser Ser Gly Gly Gly Gly Ser Gly Gly Gly Gly Ser Gly
        115                 120                 125

Gly Gly Gly Ser Asp Ile Gln Met Thr Gln Ser Pro Ser Thr Leu Ser
    130                 135                 140

Ala Ser Val Gly Asp Arg Val Thr Ile Thr Cys Arg Ala Ser Gln Ser
145                 150                 155                 160

Ile Ser Ser Trp Leu Ala Trp Tyr Gln Gln Lys Pro Gly Lys Ala Pro
                165                 170                 175

Lys Leu Leu Ile Ser Asp Ala Ser Ser Leu Glu Ser Gly Val Pro Ser
            180                 185                 190

Arg Phe Ser Gly Ser Gly Ser Gly Thr Glu Phe Thr Leu Thr Ile Ser
        195                 200                 205

Ser Leu Gln Pro Asp Asp Phe Ala Thr Tyr Tyr Cys Gln Gln Ala Asn
    210                 215                 220

Thr Tyr Ser Pro Thr Phe Gly Gly Gly Thr Lys Val Glu Ile Lys
225                 230                 235

<210> SEQ ID NO 27
<211> LENGTH: 242
<212> TYPE: PRT
<213> ORGANISM: Artificial
<220> FEATURE:
<223> OTHER INFORMATION: Clone 80 scFv amino acid sequence

<400> SEQUENCE: 27

Gln Val Gln Leu Gln Glu Ser Gly Pro Gly Leu Val Lys Pro Ser Gly
1               5                   10                  15

Thr Leu Ser Leu Thr Cys Ala Val Ser Gly Gly Ser Ile Ser Ser Ser
            20                  25                  30

Asn Trp Trp Ser Trp Val Arg Gln Pro Pro Gly Lys Gly Leu Glu Trp
        35                  40                  45

Ile Gly Glu Ile Tyr His Ser Gly Ser Thr Asn Tyr Asn Pro Ser Leu
    50                  55                  60

Lys Ser Arg Val Thr Ile Ser Val Asp Lys Ser Lys Asn Gln Phe Ser
65                  70                  75                  80
```

```
Leu Lys Leu Ser Ser Val Thr Ala Ala Asp Thr Ala Val Tyr Tyr Cys
            85                  90                  95

Ala Arg Leu Pro Gly Tyr Glu Ser Ala Phe Asp Ile Trp Gly Gln Gly
        100                 105                 110

Thr Met Val Thr Val Ser Ser Gly Gly Gly Gly Ser Gly Gly Gly Gly
            115                 120                 125

Ser Gly Gly Gly Ser Glu Ile Val Leu Thr Gln Ser Pro Gly Thr
    130                 135                 140

Leu Ser Leu Ser Pro Gly Glu Arg Ala Thr Leu Ser Cys Arg Ala Ser
145                 150                 155                 160

Gln Ser Val Ser Ser Tyr Leu Ala Trp Tyr Gln Gln Lys Pro Gly
            165                 170                 175

Gln Ala Pro Arg Leu Leu Ile Tyr Gly Ala Ser Ser Arg Ala Thr Gly
            180                 185                 190

Ile Pro Asp Arg Phe Ser Gly Ser Gly Ser Gly Thr Asp Phe Thr Leu
            195                 200                 205

Thr Ile Ser Arg Leu Glu Pro Glu Asp Phe Ala Val Tyr Tyr Cys Gln
    210                 215                 220

Gln Ala Gly Leu Phe Pro Tyr Thr Phe Gly Gly Gly Thr Lys Val Glu
225                 230                 235                 240

Ile Lys

<210> SEQ ID NO 28
<211> LENGTH: 246
<212> TYPE: PRT
<213> ORGANISM: Artificial
<220> FEATURE:
<223> OTHER INFORMATION: M971 scFv amino acid sequence

<400> SEQUENCE: 28

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
            20                  25                  30

Ser Ala Ala Trp Asn Trp Ile Arg Gln Ser Pro Ser Arg Gly Leu Glu
        35                  40                  45

Trp Leu Gly Arg Thr Tyr Tyr Arg Ser Lys Trp Tyr Asn Asp Tyr Ala
    50                  55                  60

Val Ser Val Lys Ser Arg Ile Thr Ile Asn Pro Asp Thr Ser Lys Asn
65                  70                  75                  80

Gln Phe Ser Leu Gln Leu Asn Ser Val Thr Pro Glu Asp Thr Ala Val
            85                  90                  95

Tyr Tyr Cys Ala Arg Glu Val Thr Gly Asp Leu Glu Asp Ala Phe Asp
        100                 105                 110

Ile Trp Gly Gln Gly Thr Met Val Thr Val Ser Ser Gly Gly Gly Gly
    115                 120                 125

Ser Gly Gly Gly Gly Ser Gly Gly Gly Gly Ser Asp Ile Gln Met Thr
    130                 135                 140

Gln Ser Pro Ser Ser Leu Ser Ala Ser Val Gly Asp Arg Val Thr Ile
145                 150                 155                 160

Thr Cys Arg Ala Ser Gln Thr Ile Trp Ser Tyr Leu Asn Trp Tyr Gln
            165                 170                 175

Gln Arg Pro Gly Lys Ala Pro Asn Leu Leu Ile Tyr Ala Ala Ser Ser
            180                 185                 190

Leu Gln Ser Gly Val Pro Ser Arg Phe Ser Gly Arg Gly Ser Gly Thr
```

```
                195                 200                 205

Asp Phe Thr Leu Thr Ile Ser Ser Leu Gln Ala Glu Asp Phe Ala Thr
    210                 215                 220

Tyr Tyr Cys Gln Gln Ser Tyr Ser Ile Pro Gln Thr Phe Gly Gln Gly
225                 230                 235                 240

Thr Lys Leu Glu Ile Lys
                245

<210> SEQ ID NO 29
<211> LENGTH: 18
<212> TYPE: PRT
<213> ORGANISM: Artificial
<220> FEATURE:
<223> OTHER INFORMATION: T2A amino acid sequence

<400> SEQUENCE: 29

Glu Gly Arg Gly Ser Leu Leu Thr Cys Gly Asp Val Glu Glu Asn Pro
1               5                   10                  15

Gly Pro

<210> SEQ ID NO 30
<211> LENGTH: 21
<212> TYPE: PRT
<213> ORGANISM: Artificial
<220> FEATURE:
<223> OTHER INFORMATION: CD8 signal peptide amino acid sequence

<400> SEQUENCE: 30

Met Ala Leu Pro Val Thr Ala Leu Leu Leu Pro Leu Ala Leu Leu Leu
1               5                   10                  15

His Ala Ala Arg Pro
            20

<210> SEQ ID NO 31
<211> LENGTH: 83
<212> TYPE: PRT
<213> ORGANISM: Artificial
<220> FEATURE:
<223> OTHER INFORMATION: CD8 hinge region and transmembrane region amino
      acid sequence

<400> SEQUENCE: 31

Phe Val Pro Val Phe Leu Pro Ala Lys Pro Thr Thr Thr Pro Ala Pro
1               5                   10                  15

Arg Pro Pro Thr Pro Ala Pro Thr Ile Ala Ser Gln Pro Leu Ser Leu
            20                  25                  30

Arg Pro Glu Ala Cys Arg Pro Ala Ala Gly Gly Ala Val His Thr Arg
        35                  40                  45

Gly Leu Asp Phe Ala Cys Asp Ile Tyr Ile Trp Ala Pro Leu Ala Gly
    50                  55                  60

Thr Cys Gly Val Leu Leu Leu Ser Leu Val Ile Thr Leu Tyr Cys Asn
65                  70                  75                  80

His Arg Asn

<210> SEQ ID NO 32
<211> LENGTH: 42
<212> TYPE: PRT
<213> ORGANISM: Artificial
<220> FEATURE:
<223> OTHER INFORMATION: 4-1BB costimulatory signaling domain amino acid
      sequence
```

```
<400> SEQUENCE: 32

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
            35                  40

<210> SEQ ID NO 33
<211> LENGTH: 112
<212> TYPE: PRT
<213> ORGANISM: Artificial
<220> FEATURE:
<223> OTHER INFORMATION: CD3z intracellular signaling domain amino acid
      sequence

<400> SEQUENCE: 33

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 34
<211> LENGTH: 357
<212> TYPE: PRT
<213> ORGANISM: Artificial
<220> FEATURE:
<223> OTHER INFORMATION: tEGFR amino acid sequence

<400> SEQUENCE: 34

Met Leu Leu Leu Val Thr Ser Leu Leu Leu Cys Glu Leu Pro His Pro
1               5                   10                  15

Ala Phe Leu Leu Ile Pro Arg Lys Val Cys Asn Gly Ile Gly Ile Gly
            20                  25                  30

Glu Phe Lys Asp Ser Leu Ser Ile Asn Ala Thr Asn Ile Lys His Phe
        35                  40                  45

Lys Asn Cys Thr Ser Ile Ser Gly Asp Leu His Ile Leu Pro Val Ala
50                  55                  60

Phe Arg Gly Asp Ser Phe Thr His Thr Pro Pro Leu Asp Pro Gln Glu
65                  70                  75                  80

Leu Asp Ile Leu Lys Thr Val Lys Glu Ile Thr Gly Phe Leu Leu Ile
                85                  90                  95

Gln Ala Trp Pro Glu Asn Arg Thr Asp Leu His Ala Phe Glu Asn Leu
            100                 105                 110

Glu Ile Ile Arg Gly Arg Thr Lys Gln His Gly Gln Phe Ser Leu Ala
        115                 120                 125

Val Val Ser Leu Asn Ile Thr Ser Leu Gly Leu Arg Ser Leu Lys Glu
130                 135                 140
```

Ile Ser Asp Gly Asp Val Ile Ile Ser Gly Asn Lys Asn Leu Cys Tyr
145                 150                 155                 160

Ala Asn Thr Ile Asn Trp Lys Lys Leu Phe Gly Thr Ser Gly Gln Lys
                165                 170                 175

Thr Lys Ile Ile Ser Asn Arg Gly Glu Asn Ser Cys Lys Ala Thr Gly
            180                 185                 190

Gln Val Cys His Ala Leu Cys Ser Pro Glu Gly Cys Trp Gly Pro Glu
        195                 200                 205

Pro Arg Asp Cys Val Ser Cys Arg Asn Val Ser Arg Gly Arg Glu Cys
    210                 215                 220

Val Asp Lys Cys Asn Leu Leu Glu Gly Glu Pro Arg Glu Phe Val Glu
225                 230                 235                 240

Asn Ser Glu Cys Ile Gln Cys His Pro Glu Cys Leu Pro Gln Ala Met
                245                 250                 255

Asn Ile Thr Cys Thr Gly Arg Gly Pro Asp Asn Cys Ile Gln Cys Ala
                260                 265                 270

His Tyr Ile Asp Gly Pro His Cys Val Lys Thr Cys Pro Ala Gly Val
            275                 280                 285

Met Gly Glu Asn Asn Thr Leu Val Trp Lys Tyr Ala Asp Ala Gly His
        290                 295                 300

Val Cys His Leu Cys His Pro Asn Cys Thr Tyr Gly Cys Thr Gly Pro
305                 310                 315                 320

Gly Leu Glu Gly Cys Pro Thr Asn Gly Pro Lys Ile Pro Ser Ile Ala
                325                 330                 335

Thr Gly Met Val Gly Ala Leu Leu Leu Leu Leu Val Val Ala Leu Gly
            340                 345                 350

Ile Gly Leu Phe Met
            355

<210> SEQ ID NO 35
<211> LENGTH: 520
<212> TYPE: PRT
<213> ORGANISM: Artificial
<220> FEATURE:
<223> OTHER INFORMATION: Clone 17 CAR amino acid sequence

<400> SEQUENCE: 35

Met Ala Leu Pro Val Thr Ala Leu Leu Leu Pro Leu Ala Leu Leu Leu
1               5                   10                  15

His Ala Ala Arg Pro Glu Val Gln Leu Leu Glu Ser Gly Gly Gly Leu
            20                  25                  30

Val Gln Pro Gly Gly Ser Leu Arg Leu Ser Cys Ala Ala Ser Gly Phe
        35                  40                  45

Thr Phe Ser Ser Tyr Ala Met Ser Trp Val Arg Gln Ala Pro Gly Lys
    50                  55                  60

Gly Leu Glu Trp Val Ser Ala Ile Ser Gly Ser Gly Gly Ser Thr Tyr
65                  70                  75                  80

Tyr Ala Asp Ser Val Lys Gly Arg Phe Thr Ile Ser Arg Asp Asn Ser
                85                  90                  95

Lys Asn Thr Leu Tyr Leu Gln Met Asn Ser Leu Arg Ala Glu Asp Thr
            100                 105                 110

Ala Val Tyr Tyr Cys Ala Lys Val Gly Ile Ser Ser Leu His Gly Met
        115                 120                 125

Asp Val Trp Gly Gln Gly Thr Thr Val Thr Val Ser Ser Gly Gly Gly
    130                 135                 140

Gly Ser Gly Gly Gly Ser Gly Gly Gly Ser Asp Ile Gln Met
145                 150                 155                 160

Thr Gln Ser Pro Ser Thr Leu Ser Ala Ser Val Gly Asp Arg Val Thr
            165                 170                 175

Ile Thr Cys Arg Ala Ser Gln Ser Ile Ser Ser Trp Leu Ala Trp Tyr
        180                 185                 190

Gln Gln Lys Pro Gly Lys Ala Pro Lys Leu Leu Ile Tyr Lys Ala Ser
            195                 200                 205

Ser Leu Glu Ser Gly Val Pro Ser Arg Phe Ser Gly Ser Gly Ser Gly
210                 215                 220

Thr Glu Phe Thr Leu Thr Ile Ser Ser Leu Gln Pro Asp Asp Phe Ala
225                 230                 235                 240

Thr Tyr Tyr Cys Gln Gln Tyr Glu Arg Phe Pro Trp Thr Phe Gly Gly
                245                 250                 255

Gly Thr Lys Val Glu Ile Lys Phe Val Pro Val Phe Leu Pro Ala Lys
            260                 265                 270

Pro Thr Thr Thr Pro Ala Pro Arg Pro Pro Thr Pro Ala Pro Thr Ile
        275                 280                 285

Ala Ser Gln Pro Leu Ser Leu Arg Pro Glu Ala Cys Arg Pro Ala Ala
290                 295                 300

Gly Gly Ala Val His Thr Arg Gly Leu Asp Phe Ala Cys Asp Ile Tyr
305                 310                 315                 320

Ile Trp Ala Pro Leu Ala Gly Thr Cys Gly Val Leu Leu Leu Ser Leu
                325                 330                 335

Val Ile Thr Leu Tyr Cys Asn His Arg Asn Lys Arg Gly Arg Lys Lys
            340                 345                 350

Leu Leu Tyr Ile Phe Lys Gln Pro Phe Met Arg Pro Val Gln Thr Thr
355                 360                 365

Gln Glu Glu Asp Gly Cys Ser Cys Arg Phe Pro Glu Glu Glu Glu Gly
370                 375                 380

Gly Cys Glu Leu Arg Val Lys Phe Ser Arg Ser Ala Asp Ala Pro Ala
385                 390                 395                 400

Tyr Gln Gln Gly Gln Asn Gln Leu Tyr Asn Glu Leu Asn Leu Gly Arg
                405                 410                 415

Arg Glu Glu Tyr Asp Val Leu Asp Lys Arg Arg Gly Arg Asp Pro Glu
            420                 425                 430

Met Gly Gly Lys Pro Arg Arg Lys Asn Pro Gln Glu Gly Leu Tyr Asn
        435                 440                 445

Glu Leu Gln Lys Asp Lys Met Ala Glu Ala Tyr Ser Glu Ile Gly Met
450                 455                 460

Lys Gly Glu Arg Arg Arg Gly Lys Gly His Asp Gly Leu Tyr Gln Gly
465                 470                 475                 480

Leu Ser Thr Ala Thr Lys Asp Thr Tyr Asp Ala Leu His Met Gln Ala
                485                 490                 495

Leu Pro Pro Arg Gly Ser Gly Glu Gly Arg Gly Ser Leu Leu Thr Cys
            500                 505                 510

Gly Asp Val Glu Glu Asn Pro Gly
        515                 520

<210> SEQ ID NO 36
<211> LENGTH: 517
<212> TYPE: PRT
<213> ORGANISM: Artificial
<220> FEATURE:

<223> OTHER INFORMATION: Clone 28 CAR amino acid sequence

<400> SEQUENCE: 36

Met Ala Leu Pro Val Thr Ala Leu Leu Leu Pro Leu Ala Leu Leu Leu
1               5                   10                  15

His Ala Ala Arg Pro Gln Val Gln Leu Gln Glu Ser Gly Pro Gly Leu
            20                  25                  30

Val Lys Pro Ser Glu Thr Leu Ser Leu Thr Cys Thr Val Ser Gly Gly
        35                  40                  45

Ser Ile Ser Ser Tyr Tyr Trp Ser Trp Ile Arg Gln Pro Ala Gly Lys
    50                  55                  60

Gly Leu Glu Trp Ile Gly Arg Ile Tyr Thr Ser Gly Ser Thr Asn Tyr
65                  70                  75                  80

Asn Pro Ser Leu Lys Ser Arg Val Thr Met Ser Val Asp Thr Ser Lys
                85                  90                  95

Asn Gln Phe Ser Leu Lys Leu Ser Ser Val Thr Ala Ala Asp Thr Ala
            100                 105                 110

Val Tyr Tyr Cys Ala Arg Asp Leu Tyr Arg Asp Gly Met Asp Val Trp
        115                 120                 125

Gly Gln Gly Thr Thr Val Thr Val Ser Ser Gly Gly Gly Gly Ser Gly
130                 135                 140

Gly Gly Gly Ser Gly Gly Gly Ser Asp Ile Gln Met Thr Gln Ser
145                 150                 155                 160

Pro Ser Thr Leu Ser Ala Ser Val Gly Asp Arg Val Thr Ile Thr Cys
                165                 170                 175

Arg Ala Ser Gln Ser Ile Ser Ser Trp Leu Ala Trp Tyr Gln Gln Lys
            180                 185                 190

Pro Gly Lys Ala Pro Lys Leu Leu Ile Ser Asp Ala Ser Ser Leu Glu
        195                 200                 205

Ser Gly Val Pro Ser Arg Phe Ser Gly Ser Gly Ser Gly Thr Glu Phe
    210                 215                 220

Thr Leu Thr Ile Ser Ser Leu Gln Pro Asp Asp Phe Ala Thr Tyr Tyr
225                 230                 235                 240

Cys Gln Gln Ala Asn Thr Tyr Ser Pro Thr Phe Gly Gly Gly Thr Lys
                245                 250                 255

Val Glu Ile Lys Phe Val Pro Val Phe Leu Pro Ala Lys Pro Thr Thr
            260                 265                 270

Thr Pro Ala Pro Arg Pro Pro Thr Pro Ala Pro Thr Ile Ala Ser Gln
        275                 280                 285

Pro Leu Ser Leu Arg Pro Glu Ala Cys Arg Pro Ala Ala Gly Gly Ala
    290                 295                 300

Val His Thr Arg Gly Leu Asp Phe Ala Cys Asp Ile Tyr Ile Trp Ala
305                 310                 315                 320

Pro Leu Ala Gly Thr Cys Gly Val Leu Leu Leu Ser Leu Val Ile Thr
                325                 330                 335

Leu Tyr Cys Asn His Arg Asn Lys Arg Gly Arg Lys Lys Leu Leu Tyr
            340                 345                 350

Ile Phe Lys Gln Pro Phe Met Arg Pro Val Gln Thr Thr Gln Glu Glu
        355                 360                 365

Asp Gly Cys Ser Cys Arg Phe Pro Glu Glu Glu Glu Gly Gly Cys Glu
    370                 375                 380

Leu Arg Val Lys Phe Ser Arg Ser Ala Asp Ala Pro Ala Tyr Gln Gln
385                 390                 395                 400

```
Gly Gln Asn Gln Leu Tyr Asn Glu Leu Asn Leu Gly Arg Arg Glu Glu
                405                 410                 415

Tyr Asp Val Leu Asp Lys Arg Arg Gly Arg Asp Pro Glu Met Gly Gly
            420                 425                 430

Lys Pro Arg Arg Lys Asn Pro Gln Glu Gly Leu Tyr Asn Glu Leu Gln
        435                 440                 445

Lys Asp Lys Met Ala Glu Ala Tyr Ser Glu Ile Gly Met Lys Gly Glu
    450                 455                 460

Arg Arg Arg Gly Lys His Asp Gly Leu Tyr Gln Gly Leu Ser Thr
465                 470                 475                 480

Ala Thr Lys Asp Thr Tyr Asp Ala Leu His Met Gln Ala Leu Pro Pro
            485                 490                 495

Arg Gly Ser Gly Glu Gly Arg Gly Ser Leu Leu Thr Cys Gly Asp Val
        500                 505                 510

Glu Glu Asn Pro Gly
        515

<210> SEQ ID NO 37
<211> LENGTH: 520
<212> TYPE: PRT
<213> ORGANISM: Artificial
<220> FEATURE:
<223> OTHER INFORMATION: Clone 80 CAR amino acid sequence

<400> SEQUENCE: 37

Met Ala Leu Pro Val Thr Ala Leu Leu Leu Pro Leu Ala Leu Leu Leu
1               5                   10                  15

His Ala Ala Arg Pro Gln Val Gln Leu Gln Glu Ser Gly Pro Gly Leu
            20                  25                  30

Val Lys Pro Ser Gly Thr Leu Ser Leu Thr Cys Ala Val Ser Gly Gly
        35                  40                  45

Ser Ile Ser Ser Ser Asn Trp Trp Ser Trp Val Arg Gln Pro Pro Gly
    50                  55                  60

Lys Gly Leu Glu Trp Ile Gly Glu Ile Tyr His Ser Gly Ser Thr Asn
65                  70                  75                  80

Tyr Asn Pro Ser Leu Lys Ser Arg Val Thr Ile Ser Val Asp Lys Ser
                85                  90                  95

Lys Asn Gln Phe Ser Leu Lys Leu Ser Ser Val Thr Ala Ala Asp Thr
            100                 105                 110

Ala Val Tyr Tyr Cys Ala Arg Leu Pro Gly Tyr Glu Ser Ala Phe Asp
        115                 120                 125

Ile Trp Gly Gln Gly Thr Met Val Thr Val Ser Ser Gly Gly Gly Gly
    130                 135                 140

Ser Gly Gly Gly Gly Ser Gly Gly Gly Gly Ser Glu Ile Val Leu Thr
145                 150                 155                 160

Gln Ser Pro Gly Thr Leu Ser Leu Ser Pro Gly Glu Arg Ala Thr Leu
                165                 170                 175

Ser Cys Arg Ala Ser Gln Ser Val Ser Ser Ser Tyr Leu Ala Trp Tyr
            180                 185                 190

Gln Gln Lys Pro Gly Gln Ala Pro Arg Leu Leu Ile Tyr Gly Ala Ser
        195                 200                 205

Ser Arg Ala Thr Gly Ile Pro Asp Arg Phe Ser Gly Ser Gly Ser Gly
    210                 215                 220

Thr Asp Phe Thr Leu Thr Ile Ser Arg Leu Glu Pro Glu Asp Phe Ala
225                 230                 235                 240
```

```
Val Tyr Tyr Cys Gln Gln Ala Gly Leu Phe Pro Tyr Thr Phe Gly Gly
            245                 250                 255

Gly Thr Lys Val Glu Ile Lys Phe Val Pro Val Phe Leu Pro Ala Lys
        260                 265                 270

Pro Thr Thr Thr Pro Ala Pro Arg Pro Pro Thr Pro Ala Pro Thr Ile
        275                 280                 285

Ala Ser Gln Pro Leu Ser Leu Arg Pro Glu Ala Cys Arg Pro Ala Ala
        290                 295                 300

Gly Gly Ala Val His Thr Arg Gly Leu Asp Phe Ala Cys Asp Ile Tyr
305                 310                 315                 320

Ile Trp Ala Pro Leu Ala Gly Thr Cys Gly Val Leu Leu Leu Ser Leu
            325                 330                 335

Val Ile Thr Leu Tyr Cys Asn His Arg Asn Lys Arg Gly Arg Lys Lys
            340                 345                 350

Leu Leu Tyr Ile Phe Lys Gln Pro Phe Met Arg Pro Val Gln Thr Thr
            355                 360                 365

Gln Glu Glu Asp Gly Cys Ser Cys Arg Phe Pro Glu Glu Glu Glu Gly
        370                 375                 380

Gly Cys Glu Leu Arg Val Lys Phe Ser Arg Ser Ala Asp Ala Pro Ala
385                 390                 395                 400

Tyr Gln Gln Gly Gln Asn Gln Leu Tyr Asn Glu Leu Asn Leu Gly Arg
            405                 410                 415

Arg Glu Glu Tyr Asp Val Leu Asp Lys Arg Arg Gly Arg Asp Pro Glu
            420                 425                 430

Met Gly Gly Lys Pro Arg Arg Lys Asn Pro Gln Glu Gly Leu Tyr Asn
        435                 440                 445

Glu Leu Gln Lys Asp Lys Met Ala Glu Ala Tyr Ser Glu Ile Gly Met
450                 455                 460

Lys Gly Glu Arg Arg Arg Gly Lys Gly His Asp Gly Leu Tyr Gln Gly
465                 470                 475                 480

Leu Ser Thr Ala Thr Lys Asp Thr Tyr Asp Ala Leu His Met Gln Ala
            485                 490                 495

Leu Pro Pro Arg Gly Ser Gly Glu Gly Arg Gly Ser Leu Leu Thr Cys
        500                 505                 510

Gly Asp Val Glu Glu Asn Pro Gly
        515                 520

<210> SEQ ID NO 38
<211> LENGTH: 726
<212> TYPE: DNA
<213> ORGANISM: Artificial
<220> FEATURE:
<223> OTHER INFORMATION: Clone 17 scFv nucleotide sequence

<400> SEQUENCE: 38
gaggtgcagc tgttggagtc tgggggaggc ttggtacagc ctgggggtc cctgagactc      60 tcctgtgcag cctctggatt caccttagc agctatgcca tgagctgggt ccgccaggct     120
ccagggaagg ggctggagtg gtctcagct attagtggta gtggtggtag cacatactac     180
gcagactccg tgaagggccg gttcaccatc tccagagaca attccaagaa cacgctgtat    240
ctgcaaatga acagcctgag agccgaggac acggcggtgt actactgcgc caaggtagga    300
atatccagct acacggaat ggacgtatgg ggccagggaa caactgtcac cgtcagctca     360
ggtggcgggg gcagcggcgg aggcggatcc ggaggcggag ggagtgacat ccagatgacc    420
cagtctcctt ccaccctgtc tgcatctgta ggagacagag tcaccatcac ttgccgggcc    480
```

```
agtcagagta ttagtagctg gttggcctgg tatcagcaga aaccagggaa agcccctaag    540
ctcctgatct ataaagcctc cagtttggaa agtggggtcc catcaaggtt cagcggcagt    600
ggatctggga cagaattcac tctcaccatc agcagcctgc agcctgatga ttttgcaact    660
tattactgcc agcagtacga acgcttccct tggacttttg gcggagggac caaggttgag    720
atcaaa                                                               726
```

<210> SEQ ID NO 39
<211> LENGTH: 717
<212> TYPE: DNA
<213> ORGANISM: Artificial
<220> FEATURE:
<223> OTHER INFORMATION: Clone 28 scFv nucleotide sequence

<400> SEQUENCE: 39

```
caggtgcagc tgcaggagtc gggcccagga ctggtgaagc cttcggagac cctgtccctc     60
acctgcactg tctctggtgg ctccatcagt agttactact ggagctggat ccggcagccc    120
gccgggaagg gactggagtg gattgggcgt atctatacca gtgggagcac caactacaac    180
ccctccctca gagtcgagt caccatgtca gtagacacgt ccaagaacca gttctccctg    240
aagctgagct ctgtgaccgc cgcggacacg gcggtgtact actgcgccag agacttgtac    300
agagatggaa tggacgtatg gggccaggga caactgtca ccgtcagctc aggtggcggg    360
ggcagcggcg gaggcggatc cggaggcgga gggagtgaca tccagatgac ccagtctcct    420
tccaccctgt ctgcatctgt aggagacaga gtcaccatca cttgccgggc cagtcagagt    480
attagtagct ggttggcctg gtatcagcag aaaccaggga agcccctaa gctcctgatc    540 tccgatgcct ccagtttgga aagtggggtc ccatcaaggt tcagcggcag tggatctggg    600
acagaattca ctctcaccat cagcagcctg agcctgatga ttttgcaac ttattactgc    660 cagcaggcca atacctactc tcctacttttt ggcggaggga ccaaggttga gatcaaa      717
```

<210> SEQ ID NO 40
<211> LENGTH: 726
<212> TYPE: DNA
<213> ORGANISM: Artificial
<220> FEATURE:
<223> OTHER INFORMATION: Clone 80 scFv nucleotide sequence

<400> SEQUENCE: 40

```
caggtgcagc tgcaggagtc gggcccagga ctggtgaagc cttcggggac cctgtccctc     60
acctgcgctg tctctggtgg ctccatcagc agtagtaact ggtggagttg ggtccgccag    120
cccccaggga aggggctgga gtggattggg gaaatctatc atagtgggag caccaactac    180
aacccgtccc tcaagagtcg agtcaccata tcagtagaca gtccaagaa ccagttctcc    240 ctgaagctga gctctgtgac cgccgcggac acggcggtgt actactgcgc cagacttcct    300
ggatacgagt cagcttttga catatggggt caggtacaa tggtcaccgt cagctcaggt    360
ggcgggggca gcggcggagg cggatccgga ggcggaggga gtgaaattgt gttgacgcag    420
tctccaggca ccctgtcttt gtctccaggg gaaagagcca ccctctcctg cagggccagt    480
cagagtgtta gcagcagcta cttagcctgg taccagcaga aacctggcca ggctcccagg    540
ctcctcatct atggtgcatc cagcagggcc actggcatcc cagacaggtt cagtggcagt    600
gggtctggga cagacttcac tctcaccatc agcagactgg agcctgaaga ttttgcagtg    660
tattactgtc agcaggccgg actcttccct tacacttttg gcggagggac caaggttgag    720
``` atcaaa 726

<210> SEQ ID NO 41
<211> LENGTH: 738
<212> TYPE: DNA
<213> ORGANISM: Artificial
<220> FEATURE:
<223> OTHER INFORMATION: M971 scFv nucleotide sequence

<400> SEQUENCE: 41

| | | |
|---|---|---|
| caggtgcagc tccagcagag cggccccggc ctggtaaagc ccagccaaac cctctccctg | 60 |
| acctgcgcta tcagcggcga ttccgtgagc agcaacagcg ccgcctggaa ttggatccgt | 120 |
| cagagcccca gcaggggcct ggagtggctg gggcggacct attaccggag taagtggtac | 180 |
| aacgactacg ccgtaagcgt gaagagccgc atcaccatta atcctgacac cagcaagaac | 240 |
| cagttcagtc tgcagctgaa cagcgtgact cccgaggaca ccgccgtgta ctactgcgcc | 300 |
| cgcgaggtga ctggagacct ggaagacgcc ttcgacatct ggggccaggg cacaatggtg | 360 |
| accgtcagca gcggtggcgg gggcagcggc ggaggcggat ccgaggcgg agggagtgac | 420 |
| atacagatga cccagagccc tagcagcctc tctgccagcg tgggagaccg ggtgaccatc | 480 |
| acctgccgcg ccagtcagac catctggtct tatctgaact ggtaccagca acggcccggc | 540 |
| aaggccccta acctgttgat ctacgccgcc agcagtctcc agagcggcgt tccatctcgc | 600 |
| ttcagcggcc gcggcagcgg cacagacttc accctgacca tcagcagcct gcaggccgag | 660 |
| gacttcgcca cctactactg ccagcagagc tacagcatcc cccagacttt cggacagggc | 720 |
| accaagttgg agatcaaa | 738 |

<210> SEQ ID NO 42
<211> LENGTH: 2276
<212> TYPE: DNA
<213> ORGANISM: Artificial
<220> FEATURE:
<223> OTHER INFORMATION: Nucleotide sequence of CAR portion in PXL0662

<400> SEQUENCE: 42

| | | |
|---|---|---|
| gccgccacca tggccctgcc tgtgacagct ctgctcctcc ctctggccct gctgctccat | 60 |
| gccgccagac ccgagacgtg agaattaata cgactcacta tagggggact ggtgaaatgc | 120 |
| agttcaaggt ttacacctat aaaagagaga gccgctatcg cctgtttgtg atgtacagga | 180 |
| gtgatattat tgacacgccc gggcgacgga tggtgatccc cctggccagt gcacgtctgc | 240 |
| tgtcagataa agtctcccgt gaactttacc cggtggtgca tatcggggat gaaagctggc | 300 |
| gcatgatgac cacccagatg gtcagtgtgc cggtctccgt catcggagaa gaagtggctg | 360 |
| atctcagcca ccgcgaaaat gacatcaaaa acgccattaa tctgatgttc tggggaatat | 420 |
| aacgtctctt cgtgcccgtg ttcctgcccg ccaaacctac caccaccct gcccctagac | 480 |
| ctcccacccc agccccaaca atcgccagca gcctctgtc tctgcggccc gaagcctgta | 540 |
| gacctgctgc cggcggagcc gtgcacacca gaggcctgga cttcgcctgc gacatctaca | 600 |
| tctgggcccc tctggccggc acctgtggcg tgctgctgct gagcctggtg atcaccctgt | 660 |
| actgcaacca ccgaacaaa cggggcagaa agaaactcct gtatatattc aaacaaccat | 720 |
| ttatgagacc agtacaaact actcaagagg aagatggctg tagctgccga tttccagaag | 780 |
| aagaagaagg aggatgtgaa ctgagagtga agttcagcag atcgccgac gcccctgcct | 840 |
| accagcaggg acagaaccag ctgtacaacg agctgaacct gggcagacgg gaagagtacg | 900 |
| acgtgctgga caagcggaga ggccgggacc ccgagatggg cggaaagccc agacggaaga | 960 |

```
accccccagga aggcctgtat aacgaactgc agaaagacaa gatggccgag gcctacagcg   1020
agatcggcat gaagggcgag cggaggcgcg gcaagggcca cgatggcctg taccagggcc   1080
tgagcaccgc caccaaggac acctacgacg ccctgcacat gcaggccctg ccccccagag   1140
gatccggaga gggaaggggc agcttattaa catgtggcga tgtggaagag aaccccggtc   1200
ccatgctgct gctcgtgacc tctttactgt tatgtgagct gccccacccc gcttttttac   1260
tgatccctcg taaggtgtgt aacgaatcgc attggcga gttcaaggac tctttaagca   1320
tcaacgccac aaacatcaag cacttcaaga attgtacctc catcagcggc gatttacaca   1380
ttctccccgt ggcttttcgt ggcgattcct tcacccacac ccccctctg gacccccaag    1440 agctggacat tttaaaaacc gtgaaggaga tcaccggctt tctgctgatc caagcttggc   1500
ccgagaatcg taccgacctc cacgccttcg agaatttaga gattattcgt ggaaggacca   1560
agcagcacgg ccagttctct ttagccgtcg tgtctttaaa cattaccagc ctcggtttaa   1620
ggtctttaaa ggagattagc gacggcgacg tgatcatctc cggcaacaag aacctctgct   1680
acgccaacac catcaactgg aagaagctgt tcggaaccag cggccaaaag accaagatca   1740
tcagcaatcg tggagagaac tcttgtaagg ccactggtca agtttgccac gccctctgta   1800
gccccgaagg atgttggggc cccgagccta gggactgtgt tagctgcaga acgtgagca   1860 gaggcagaga gtgtgtggac aaatgcaatt tactggaagg agagcctagg gagttcgtgg   1920
agaacagcga atgtatccag tgccacccg agtgtttacc tcaagccatg aacatcactt   1980
gtaccggaag gggcccccgat aactgcatcc aatgcgccca ctacatcgac ggaccccact   2040
gcgtgaaaac ttgtcccgcc ggagtgatgg agagaataa cactttagtg tggaagtacg   2100
ccgacgctgg ccacgtctgc catctgtgcc accccaactg tacctacggc tgcactggtc   2160
ccggtttaga gggatgtcct accaacggcc caagatccc ctccatcgcc accggaatgg   2220
tgggcgctct gttattactg ctggtggtgg ctctgggcat cggtttattc atgtga        2276
```

<210> SEQ ID NO 43
<211> LENGTH: 2637
<212> TYPE: DNA
<213> ORGANISM: Artificial
<220> FEATURE:
<223> OTHER INFORMATION: Clone 17 CAR nucleotide sequence

<400> SEQUENCE: 43

```
atggccctgc ctgtgacagc tctgctcctc cctctggccc tgctgctcca tgccgccaga     60
cccgaggtgc agctgttgga gtctggggga ggcttggtac agcctggggg gtccctgaga    120
ctctcctgtg cagcctctgg attcaccttt agcagctatg ccatgagctg ggtccgccag    180
gctccaggga aggggctgga gtgggtctca gctattagtg gtagtggtgg tagcacatac    240
tacgcagact ccgtgaaggg ccggttcacc atctccagag acaattccaa gaacacgctg    300
tatctgcaaa tgaacagcct gagagccgag gacacggccg tgtactactg cgccaaggta    360
ggaatatcca gcttacacgg aatggacgta tggggccagg gaacaactgt caccgtcagc    420
tcaggtggcg ggggcagcgg cggaggcgga tccggaggcg agggagtga catccagatg    480 acccagtctc cttccaccct gtctgcatct gtaggagaca gagtcaccat cacttgccgg    540
gccagtcaga gtattagtag ctggttggcc tggtatcagc agaaaccagg gaaagcccct    600
aagctcctga tctataaagc ctccagtttg gaaagtgggg tcccatcaag gttcagcggc    660
agtggatctg ggacagaatt cactctcacc atcagcagcc tgcagcctga tgattttgca    720
```

```
acttattact gccagcagta cgaacgcttc ccttggactt ttggcggagg gaccaaggtt      780
gagatcaaat tcgtgcccgt gttcctgccc gccaaaccta ctactacccc tgcacctagg      840
cctcccaccc cagccccaac aatcgccagc cagcctctgt ctctgcggcc cgaagcctgt      900
agacctgctg ccggcggagc cgtgcacacc agaggcctgg acttcgcctg cgacatctac      960
atctgggccc ctctggccgg cacctgtggc gtgctgctgc tgagcctggt gatcaccctg     1020
tactgcaacc accggaacaa acggggcaga aagaaactcc tgtatatatt caaacaacca     1080
tttatgagac cagtacaaac tactcaagag gaagatggct gtagctgccg atttccagaa     1140
gaagaagaag gaggatgtga actgagagtg aagttcagca gatccgccga cgcccctgcc     1200
taccagcagg acagaaacca gctgtacaac gagctgaacc tgggcagacg ggaagagtac     1260
gacgtgctgg acaagcggag aggccgggac cccgagatgg gcggaaagcc cagacggaag     1320 aaccccagg aaggcctgta taacgaactg cagaaagaca agatggccga ggcctacagc      1380
gagatcggca tgaagggcga gcggaggcgc ggcaagggcc acgatggcct gtaccagggc     1440
ctgagcaccg ccaccaagga cacctacgac gccctgcaca tgcaggccct gccccccaga     1500
ggatccggag agggaagggg cagcttatta acatgtggcg atgtggaaga aaccccggt      1560 cccatgctgc tgctcgtgac ctcttttactg ttatgtgagc tgccccaccc cgcttttta     1620 ctgatccctc gtaaggtgtg taacggaatc ggcattggcg agttcaagga ctctttaagc    1680
atcaacgcca caaacatcaa gcacttcaag aattgtacct ccatcagcgg cgatttacac    1740
attctccccg tggcttttcg tggcgattcc ttcacccaca ccccccctct ggaccccaa     1800 gagctggaca ttttaaaaac cgtgaaggag atcaccggct ttctgctgat ccaagcttgg    1860
cccgagaatc gtaccgacct ccacgccttc gagaatttag agattattcg tggaaggacc    1920
aagcagcacg ccagttctc tttagccgtc gtgtctttaa acattaccag cctcggttta    1980
aggtctttaa aggagattag cgacggcgac gtgatcatct ccggcaacaa gaacctctgc    2040
tacgccaaca ccatcaactg gaagaagctg ttcggaacca gcggccaaaa gaccaagatc    2100
atcagcaatc gtggagagaa ctcttgtaag gccactggtc aagtttgcca cgccctctgt    2160
agccccgaag gatgttgggg ccccgagcct agggactgtg ttagctgcag aaacgtgagc    2220
agaggcagag agtgtgtgga caaatgcaat ttactggaag agagcctag ggagttcgtg     2280 gagaacagcg aatgtatcca gtgccacccc gagtgtttac ctcaagccat gaacatcact    2340
tgtaccggaa ggggcccga taactgcatc caatgcgccc actacatcga cggaccccac    2400
tgcgtgaaaa cttgtcccgc cggagtgatg ggagagaata acactttagt gtggaagtac    2460
gccgacgctg ccacgtctg ccatctgtgc cacccaact gtacctacgg ctgcactggt     2520
cccggtttag agggatgtcc taccaacggc cccaagatcc cctccatcgc caccggaatg    2580
gtgggcgctc tgttattact gctggtggtg gctctgggca tcggtttatt catgtga       2637
```

<210> SEQ ID NO 44
<211> LENGTH: 2628
<212> TYPE: DNA
<213> ORGANISM: Artificial
<220> FEATURE:
<223> OTHER INFORMATION: Clone 28 CAR nucleotide sequence

<400> SEQUENCE: 44

```
atggccctgc ctgtgacagc tctgctcctc cctctggccc tgctgctcca tgccgccaga       60
ccccaggtgc agctgcagga gtcgggccca ggactggtga agccttcgga gaccctgtcc      120
ctcacctgca ctgtctctgg tggctccatc agtagttact actggagctg gatccggcag      180
```

```
cccgccggga agggactgga gtggattggg cgtatctata ccagtgggag caccaactac    240
aacccctccc tcaagagtcg agtcaccatg tcagtagaca cgtccaagaa ccagttctcc    300
ctgaagctga gctctgtgac cgccgcggac acggcggtgt actactgcgc cagagacttg    360
tacagagatg gaatggacgt atggggccag ggacaactg tcaccgtcag ctcaggtggc     420
gggggcagcg gcggaggcgg atccggaggc ggagggagtg acatccagat gacccagtct    480
ccttccaccc tgtctgcatc tgtaggagac agagtcacca tcacttgccg ggccagtcag    540
agtattagta gctggttggc ctggtatcag cagaaaccag ggaaagcccc taagctcctg    600
atctccgatg cctccagttt ggaaagtggg gtcccatcaa ggttcagcgg cagtggatct    660
gggacagaat tcactctcac catcagcagc ctgcagcctg atgattttgc aacttattac    720
tgccagcagg ccaataccta ctctcctact tttggcggag ggaccaaggt tgagatcaaa    780
ttcgtgcccg tgttcctgcc cgccaaaccc actactacac cagcacccag acctcccacc    840
ccagccccaa caatcgccag ccagcctctg tctctgcggc ccgaagcctg tagacctgct    900
gccggcggag ccgtgcacac cagaggcctg gacttcgcct gcgacatcta catctgggcc    960
cctctggccg gcacctgtgg cgtgctgctg ctgagcctgg tgatcaccct gtactgcaac   1020
caccggaaca aacggggcag aaagaaactc ctgtatatat tcaaacaacc atttatgaga   1080
ccagtacaaa ctactcaaga ggaagatggc tgtagctgcc gatttccaga agaagaagaa   1140
ggaggatgtg aactgagagt gaagttcagc agatccgccg acgcccctgc ctaccagcag   1200
ggacagaacc agctgtacaa cgagctgaac ctgggcagac gggaagagta cgacgtgctg   1260
gacaagcgga gaggccggga ccccgagatg ggcggaaagc ccagacggaa gaaccccag   1320 gaaggcctgt ataacgaact gcagaaagac aagatggccg aggcctacag cgagatcggc   1380
atgaagggcg agcggaggcg cggcaaggc cacgatggcc tgtaccaggg cctgagcacc   1440
gccaccaagg acacctacga cgccctgcac atgcaggccc tgccccccag aggatccgga   1500
gagggaaggg gcagcttatt aacatgtggc gatgtggaag agaaccccgg tcccatgctg   1560
ctgctcgtga cctctttact gttatgtgag ctgccccacc ccgcttttt actgatccct    1620 cgtaaggtgt gtaacggaat cggcattggc gagttcaagg actctttaag catcaacgcc   1680
acaaacatca agcacttcaa gaattgtacc tccatcagcg gcgatttaca cattctcccc   1740
gtggcttttc gtggcgattc cttcacccac acccccctc tggaccccca agagctggac   1800
attttaaaaa ccgtgaagga gatcaccggc tttctgctga tccaagcttg gcccgagaat   1860
cgtaccgacc tccacgcctt cgagaattta gagattattc gtggaaggac caagcagcac   1920
ggccagttct ctttagccgt cgtgtcttta aacattacca gcctcggttt aaggtcttta   1980
aaggagatta gcgacggcga cgtgatcatc tccggcaaca gaacctctg ctacgccaac    2040 accatcaact ggaagaagct gttcggaacc agcgccaaa agaccaagat catcagcaat    2100
cgtggagaga actcttgtaa ggccactggt caagtttgcc acgccctctg tagccccgaa   2160
ggatgttggg gccccgagcc tagggactgt gttagctgca gaaacgtgag cagaggcaga   2220
gagtgtgtgg acaaatgcaa tttactggaa ggagagccta gggagttcgt ggagaacagc   2280
gaatgtatcc agtgccaccc cgagtgttta cctcaagcca tgaacatcac ttgtaccgga   2340
aggggccccg ataactgcat ccaatgcgcc cactacatcg acggacccca ctgcgtgaaa   2400
acttgtcccg ccggagtgat gggagagaat aacactttag tgtggaagta cgccgacgct   2460
ggccacgtct gccatctgtg ccaccccaac tgtacctacg gctgcactgg tcccggttta   2520
```

-continued

| gagggatgtc ctaccaacgg ccccaagatc ccctccatcg ccaccggaat ggtgggcgct | 2580 |
| ctgttattac tgctggtggt ggctctgggc atcggtttat tcatgtga | 2628 |

```
<210> SEQ ID NO 45
<211> LENGTH: 2637
<212> TYPE: DNA
<213> ORGANISM: Artificial
<220> FEATURE:
<223> OTHER INFORMATION: Clone 80 CAR nucleotide sequence

<400> SEQUENCE: 45
```

| atggccctgc tgtgacagc tctgctcctc cctctggccc tgctgctcca tgccgccaga | 60 |
| cccccaggtgc agctgcagga gtcgggccca ggactggtga agccttcggg gaccctgtcc | 120 |
| ctcacctgcg ctgtctctgg tggctccatc agcagtagta actggtggag ttgggtccgc | 180 |
| cagcccccag ggaaggggct ggagtggatt ggggaaatct atcatagtgg gagcaccaac | 240 |
| tacaacccgt ccctcaagag tcgagtcacc atatcagtag acaagtccaa gaaccagttc | 300 |
| tccctgaagc tgagctctgt gaccgccgcg gacacggcgg tgtactactg cgccagactt | 360 |
| cctggatacg agtcagcttt cgacatatgg ggtcaggggta caatggtcac cgtcagctca | 420 |
| ggtggcgggg gcagcggcgg aggcggatcc ggaggcggag ggagtgaaat tgtgttgacg | 480 |
| cagtctccag gcaccctgtc tttgtctcca ggggaaagag ccaccctctc ctgcagggcc | 540 |
| agtcagagtg ttagcagcag ctacttagcc tggtaccagc agaaacctgg ccaggctccc | 600 |
| aggctcctca tctatggtgc atccagcagg gccactggca tcccagacag gttcagtggc | 660 |
| agtgggtctg ggacagactt cactctcacc atcagcagac tggagcctga agattttgca | 720 |
| gtgtattact gtcagcaggc cggactcttc ccttacactt ttggcggagg gaccaaggtt | 780 |
| gagatcaaat tcgtgcccgt gttcctgccc gccaaaccaa ctactactcc tgccccaagg | 840 |
| ccacccaccc cagccccaac aatcgccagc cagcctctgt ctctgcggcc cgaagcctgt | 900 |
| agacctgctg ccggcggagc cgtgcacacc agaggcctgg acttcgcctg cgacatctac | 960 |
| atctgggccc ctctggccgg cacctgtggc gtgctgctgc tgagcctggt gatcaccctg | 1020 |
| tactgcaacc accggaacaa acggggcaga aagaaactcc tgtatatatt caaacaacca | 1080 |
| tttatgagac cagtacaaac tactcaagag gaagatggct gtagctgccg atttccagaa | 1140 |
| gaagaagaag aggatgtgaa actgagagtg aagttcagca gatccgccga cgcccctgcc | 1200 |
| taccagcagg gacagaacca gctgtacaac gagctgaacc tgggcagacg ggaagagtac | 1260 |
| gacgtgctgg acaagcggag aggccgggac ccgagatgg gcggaaagcc cagacggaag | 1320 |
| aaccccagg aaggcctgta taacgaactg cagaaagaca gatggccga ggcctacagc | 1380 |
| gagatcggca tgaagggcga gcggaggcgc ggcaagggcc acgatggcct gtaccagggc | 1440 |
| ctgagcaccg ccaccaagga cacctacgac gccctgcaca tgcaggccct gcccccagag | 1500 |
| ggatccggag agggaagggg cagcttatta catgtggcg atgtggaaga aaccccggt | 1560 |
| cccatgctgc tgctcgtgac ctctttactg ttatgtgagc tgccccaccc cgcttttttta | 1620 |
| ctgatccctc gtaaggtgtg taacggaatc ggcattggcg agttcaagga ctctttaagc | 1680 |
| atcaacgcca caaacatcaa gcacttcaag aattgtacct ccatcagcgg cgatttacac | 1740 |
| attctccccg tggcttttcg tggcgattcc ttcacccaca ccccccctct ggaccccaa | 1800 |
| gagctggaca ttttaaaaac cgtgaaggag atcaccggct ttctgctgat ccaagcttgg | 1860 |
| cccgagaatc gtaccgacct ccacgccttc gagaatttag agattattcg tggaaggacc | 1920 |
| aagcagcacg gccagttctc tttagccgtc gtgtctttaa acattaccag cctcggttta | 1980 |

```
aggtctttaa aggagattag cgacggcgac gtgatcatct ccggcaacaa gaacctctgc    2040
tacgccaaca ccatcaactg gaagaagctg ttcggaacca gcggccaaaa gaccaagatc    2100
atcagcaatc gtggagagaa ctcttgtaag gccactggtc aagtttgcca cgccctctgt    2160
agccccgaag gatgttgggg ccccgagcct agggactgtg ttagctgcag aaacgtgagc    2220
agaggcagag agtgtgtgga caaatgcaat ttactggaag gagagcctag ggagttcgtg    2280
gagaacagcg aatgtatcca gtgccacccc gagtgtttac ctcaagccat gaacatcact    2340
tgtaccggaa ggggccccga taactgcatc caatgcgccc actacatcga cggaccccac    2400
tgcgtgaaaa cttgtcccgc cggagtgatg ggagagaata acactttagt gtggaagtac    2460
gccgacgctg gccacgtctg ccatctgtgc caccccaact gtacctacgg ctgcactggt    2520
cccggtttag agggatgtcc taccaacggc cccaagatcc cctccatcgc caccggaatg    2580
gtgggcgctc tgttattact gctggtggtg gctctgggca tcggtttatt catgtga      2637
```